United States Patent [19]
Tabuchi et al.

[11] Patent Number: 5,671,315
[45] Date of Patent: Sep. 23, 1997

[54] OPTICAL PARTS FIXING APPARATUS AND METHOD OF MANUFACTURING THE SAME

[75] Inventors: Haruhiko Tabuchi; Tsugio Kumai; Seimi Sasaki; Kazunori Miura, all of Kawasaki, Japan

[73] Assignee: Fujitsu Limited, Kawasaki, Japan

[21] Appl. No.: 401,273

[22] Filed: Mar. 9, 1995

[30] Foreign Application Priority Data

Mar. 9, 1994 [JP] Japan .................................. 6-038863

[51] Int. Cl.⁶ .................................................. G02B 6/00
[52] U.S. Cl. ........................... 385/137; 385/147; 385/88
[58] Field of Search ........................... 385/49, 88, 89, 385/137, 147

[56] References Cited

U.S. PATENT DOCUMENTS

| | | | |
|---|---|---|---|
| 5,243,671 | 9/1993 | Koteles et al. | 385/88 |
| 5,343,544 | 8/1994 | Boyd et al. | 385/49 X |
| 5,357,590 | 10/1994 | Auracher | 385/88 X |
| 5,394,490 | 2/1995 | Kato et al. | 385/88 X |
| 5,414,787 | 5/1995 | Kurata | 385/88 X |

FOREIGN PATENT DOCUMENTS

| | | |
|---|---|---|
| 55-157277 | 12/1980 | Japan . |
| 3-39706 | 2/1991 | Japan . |
| 5-264868 | 10/1993 | Japan . |

OTHER PUBLICATIONS

The lecture No. C–182, Autumn Conference 1993, IEICE.
The lecture No. C–280, Spring Conference 1993, IEICE.

*Primary Examiner*—Akm E. Ullah
*Attorney, Agent, or Firm*—Armstrong, Westerman, Hattori, McLeland & Naughton

[57] ABSTRACT

In an optical parts fixing device of the present invention, a substrate has an extension groove formed on an optical fiber fixing groove and has a width wider than that of the optical fiber fixing groove, or a substrate has the third groove which crosses end portions, opposed to each other, of the first groove for fitting an optical fiber therein and the second groove for fitting an optical device therein.

15 Claims, 29 Drawing Sheets

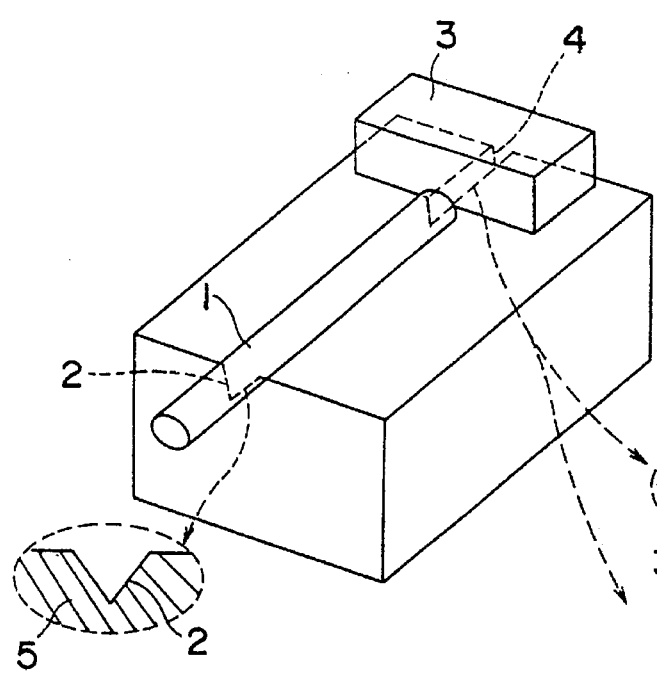
FIG.1A
(Prior Art)
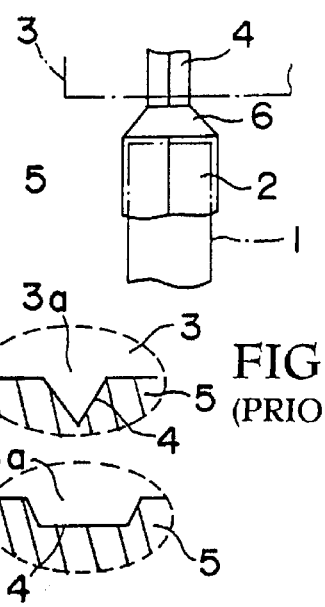
FIG.1B
(Prior Art)
FIG. 1A-2
(PRIOR ART)
FIG.1A-3
(PRIOR ART)
FIG. 1A-1
(PRIOR ART)

FIG.13E
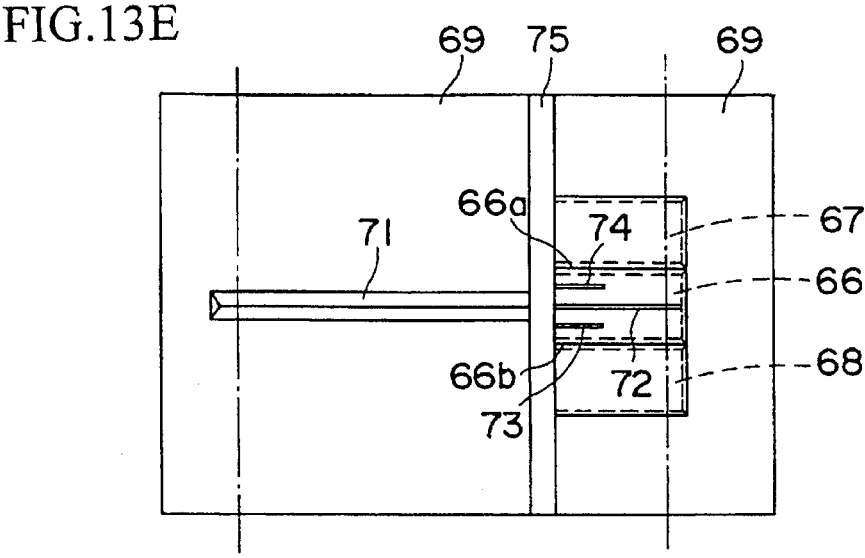
FIG.13F
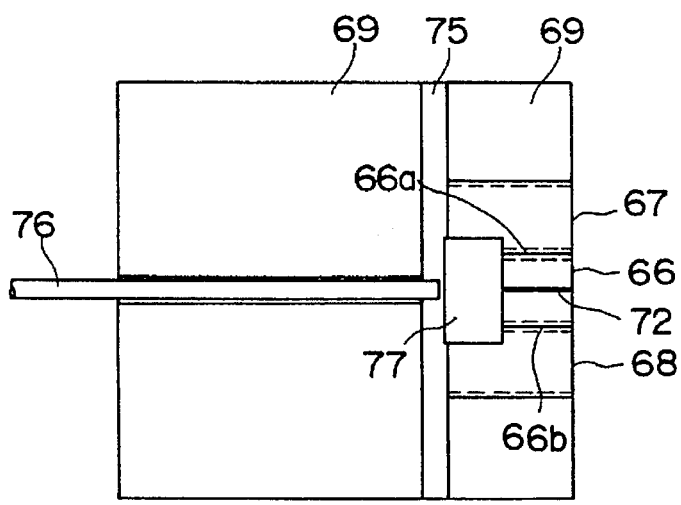
FIG.14
FIG. 14 A
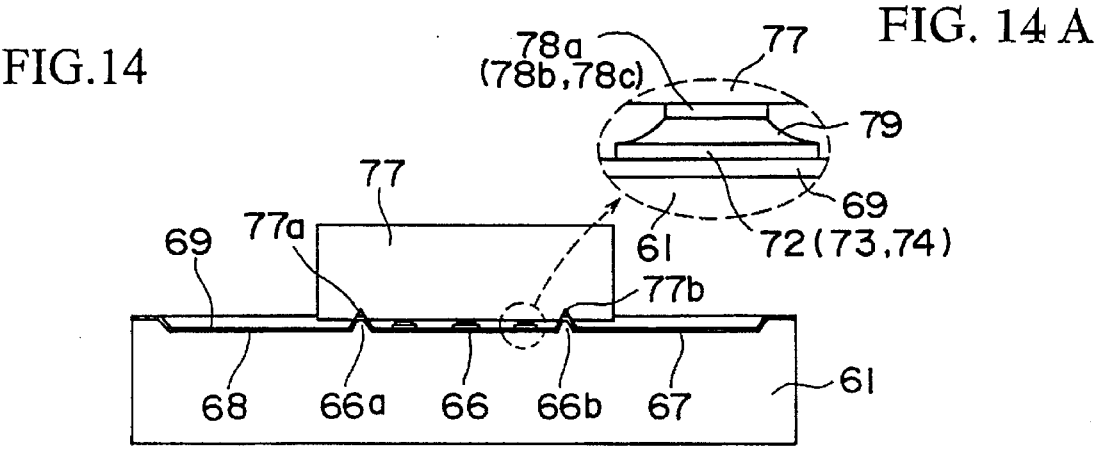

OPTICAL PARTS FIXING APPARATUS AND METHOD OF MANUFACTURING THE SAME

BACKGROUND OF THE INVENTION

1. Field of the Invention

The present invention relates to a device for fixing optical parts such as an optical fiber, a light receiving device, a light emitting device and an optical coupling device, and to a method of manufacturing the same.

2. Description of the Prior Art

In the optical communication terminal apparatus for use in information communication between public network telephones, computers and the like, the optical parts fixing device has been developed and used. In the optical communication, light emitted from a semiconductor laser as a light source is coupled optically to a single mode optical fiber, then the light is transmitted via the optical fiber, and then outputs of the optical fiber are photoelectrically converted into electric signals to be output as electric signals.

A portion of the single mode optical fiber, which serves to confine light in the optical fiber (referred to as "core" hereinafter), used as an optical transmission line is less than 10 µm in diameter. A spot of light beam emitted from a light emitting portion of the semiconductor laser is less than 2 µm in diameter. For this reason, upon optically coupling the semiconductor laser to the optical fiber, an alignment accuracy of less than 1 µm is required.

Further, in order to maintain a reliability of the semiconductor laser and the photoelectric conversion device used in the optical terminal device, such optical parts must be hermetically sealed up. In addition, in order to improve optical stability of the optical terminal device, the optical fiber must be fixed firmly and at high precision.

By way of a conventional example of relatively easily achieving a high alignment accuracy, there are optical parts fixing devices shown in FIGS. 1A and 1B.

This device is formed of a silicon substrate 5, in which the first groove 2 having a V-shaped sectional shape for holding the optical fiber 1 thereon, and the second groove 4 having a V-shaped or reverse trapezoid sectional shape for aligning the optical semiconductor device 3 are formed. This device has been disclosed in, for example, Japanese Patent Publication (KOKAI) No. 55-157277. FIG. 2A is a plane view showing the first groove 2 and the second groove 4 formed in the silicon substrate 5.

However, the optical coupling device shown in FIG. 1A has following inconveniences.

That is, in the optical coupling device shown in FIG. 1A, it is hard to form the first groove 2 and the second groove 4, both being different in size, together and with high accuracy in the silicon substrate 5. The second groove 4 has a width and a depth, each coincides with those of a narrow projection formed on the semiconductor device (semiconductor laser) 3. The first groove 2 has a wide width suitable for supporting the optical fiber, and has a depth suitable for fixing the core of the optical fiber at the same height as that of the light emitting portion of the semiconductor laser.

Since an amount of the projection of a light emitting region and a light receiving region of the semiconductor device are limited, the first groove 2 and the second groove 4 both having different sizes are required.

For instance, if the semiconductor laser is formed by using a thick compound semiconductor substrate, it is restricted to obtain a large amount of the projection of the light emitting region by deeply etching both sides of the light emitting region on the compound semiconductor substrate. That is, both ends of the semiconductor laser are cleaved to form mirror faces thereon. However, if the compound semiconductor substrate is formed thick more than 100 µm, a cleavage operation becomes difficult. Thus a device yield is lowered. Moreover, it is contrary to improvements in performances and throughputs of the semiconductor device to increase a thickness of the semiconductor layer on the active layer of the semiconductor laser. For example, the active layer is formed at a depth of 2 µm from the surface of the semiconductor laser.

In such a semiconductor laser, in order to maintain strength of the compound semiconductor substrate after the projection is formed, it is desirable that the height of the projection of the semiconductor laser has to be suppressed less than 20 µm. In case the projection higher than 50 µm is formed at its maximum, the substrate becomes weak in strength since a thickness of the remaining portion of the substrate becomes less than 50 µm. Therefore, it is impossible to form the higher projection than the above. Consequently, the depth of the second groove 4 formed on the silicon substrate 5 is 50 µm even in deepest case.

While, the depth of the first groove 2 for supporting the optical fiber is formed deeper by about 108 µm than the height of the projection of the semiconductor laser. This is because the active layer of the semiconductor is positioned near the top of the projection, then the diameter of the optical fiber is 125 µm, and then an angle of each of the V-shaped slant faces of the first groove 2 is formed at almost 54.7 degree.

When the V-shaped groove is formed, it is assumed that the silicon substrate 5 is etched to the depth of more than 50 µm by using a mask M and a stripe-like window 2W of the mask M has a stepped width shown in FIG. 2A. In place of the first and second grooves 2 and 4 to be formed on the silicon substrate 5, only one groove having a rectangular planar shape without steps is formed on the silicon substrate 5, as shown in FIG. 2B, since the monocrystal silicon substrate shows a strong anisotropy in etching. No matter how the height of the projection is made high on the semiconductor laser, the groove having a desired sectional shape cannot be obtained since the depth of more than 62.5 µm is at minimum required for the groove used for supporting the optical fiber.

Therefore, it is difficult to form the first groove 2 and second groove 4 shown in FIG. 1A with high accuracy.

In the second example, as shown in FIGS. 3A and 3B, an optical fiber 9 is disposed in a V-shaped groove 8 formed between two adjacent projections 7, each having a triangular sectional shape. An optical semiconductor device 10 is positioned on the tops of two projections 7. A shallow groove 10a to be fitted onto the tops of the projections 7 is formed on the optical semiconductor device 10. This apparatus has been disclosed in, for example, Japanese Patent Publication (KOKAI) No. 3-39706.

In the optical coupling device shown in FIG. 3A, since the device is so constructed that the optical semiconductor device 10 is placed on the tops of two projections 7, the substrate 5 does not serve as a heat sink. Hence, heat radiation from the optical semiconductor device 10 becomes insufficient so that the device can be readily deteriorated.

In general, as shown in FIGS. 4A and 4B, in the conventional method for fixing the optical fiber, first an adhesive 13 is injected into a guide hole 12 of an optical connector 11, and then an optical fiber 14 is inserted into the guide hole 12, and thereafter the adhesive 13 is stiffened so as to fix the optical fiber 14.

However, since the optical fiber 14 is 125 μm in diameter whereas the guide hole 12 is 128 μm in diameter, it is quite possible to cause a location displacement of 1.5 μm between the optical fiber 14 and the guide hole 12 at maximum. In fact, it is extremely hard to inject the adhesive 12 into the very small guide hole 12. In FIG. 4A, a reference 15 denotes a guide pin hole, and a reference 16 denotes an optical fiber covering film.

On the other hand, in the optical coupling module for coupling the optical semiconductor device to the optical fiber, a location alignment between them is extremely important as described above. Thus, as described above, such an approach is adopted that the groove is first formed on the substrate, and then the optical fiber is aligned in the groove.

In the optical coupling module, the optical fiber is fixed to the substrate in the following manner. That is, for example, as shown in FIG. 5A, thin solder layers 19 are formed respectively on the surfaces of two supporting substrates 15 and 16 along with inner surfaces of the V-shaped grooves 17 and 18, then the optical fiber 20 coated with a metal film is put between the V-shaped grooves 17 and 18, and then the resultant structure is heated to melt the solder layers 19. As a result, the optical fiber 20 is bonded and fixed to the supporting substrates 15 and 16. In FIG. 5A, a reference 21 denotes an optical semiconductor device.

However, in such fixing manner, as shown in FIG. 5B, contact areas between the optical fiber 20 and the supporting substrates 15, 16 via the solder layer becomes very small. As a result, sufficient fixing strength cannot be obtained.

To the contrary, as shown in FIG. 6A, the optical fiber 20 is firmly fixed to the substrate in another manner described below. That is, the optical fiber 20 coated with the metal film is fitted into the V-shaped groove 17 formed on the supporting substrate 15, then a solder sheet 22 is placed on a part of the optical fiber 20, then the supporting substrate 17 is placed on the resultant structure, and then the solder sheet 22 is melted by heating from the external so as to fix the optical fiber 20 to the substrate. This another manner has been disclosed in, for example, Japanese Patent Publication (KOKAI) No. 5-264868. The technique for sandwiching the optical fiber by two V-shaped grooves has been recited in the following document [1].

[1] Craig A. Armiento et al., IEEE TRANSACTION ON COMPONENTS, HYBRIDS, AND MANUFACTURING TECHNOLOGY, VOL. 15, NO. 6, DECEMBER 1992

According to the optical coupling device shown in FIG. 6A, an oxide film 22a on the solder, generated when the solder is melted, covers the V-shaped groove 18 formed on the upper supporting substrate 16, as shown in FIG. 6B. Accordingly, a distance between the inner wall of the V-shaped groove 18 and the optical fiber 20 becomes long. In addition, in order to prevent the solder from entering the optical coupling portion, the solder cannot be placed near the optical coupling portion. As a result, the upper supporting substrate 16 is placed in the air near the optical coupling portion, as shown in FIG. 6C, so that the optical fiber 20 cannot be sufficiently fixed to the substrate. Moreover, since a hollow section is produced between the V-shaped groove 17 on the supporting substrate 15 and the optical fiber 20, it becomes difficult to hermetically seal up the optical fiber fixing portion, and thus an alignment accuracy of the optical fiber near the optical coupling portion is degraded.

Also the device wherein the optical fiber fixing portion is hermetically sealed up from the external and the circumference of the optical fiber is hermetically sealed up by the solder has been proposed as one conventional method.

As has been discussed above, in the above approaches of aligning and fixing the optical fiber according to the prior art, it is difficult to place the optical fiber with high precision. Especially, in a multi-core type optical fiber, a variation in the distance between optical axes of the optical fibers becomes large. Further, in the optical coupling device according to the prior art, if the optical fiber is fixed by the solder, fixing strength is weak, and a location displacement and a variation in the optical coupling portion easily occur. As a result, such drawbacks occur that optical coupling efficiency between the optical device and the optical fiber is reduced, and the reliability based on temperature is lowered, and the like.

SUMMARY OF THE INVENTION

The present invention is to provide an optical parts fixing device for fixing the optical parts firmly and capable of hermetically sealing up the optical parts relatively easily and a method of manufacturing the same.

Further, another object of the present invention is to provide a method of manufacturing the optical parts fixing device capable of forming firmly rectangular grooves, each having a different depth, used for fixing the optical fiber to the semiconductor laser.

According to the optical parts fixing device of the present invention, a wide extension groove is formed on part of an optical fiber fixing Groove formed on each of a pair of substrates, and then an optical fiber is fixed to the optical fiber fixing grooves on a substrate.

The extension groove does not concerned with a location alignment of the optical fiber. By applying the adhesive to the extension groove, the optical fiber can be fixed by the adhesive regardless of the location alignment of the optical fiber. Further, a space between the extension groove and the optical fiber can be filled with the adhesive, so that sufficient fixing strength can be attained. In this case, since only an amount of the adhesive for filling the inside of the extension groove is required, the adhesive (for example, solder) can be prevented from flowing out to the space between the optical fiber fixing grooves and the optical fiber. Therefore, the optical fiber is supported directly by the inner wall of the optical fiber fixing grooves and can thus be precisely positioned.

According to further invention, a first groove used for fitting an optical fiber and a second groove used for fitting an optical semiconductor device are formed on a substrate, and then a third groove is formed on the substrate along the direction crossing the first and second groove end portions which are opposed to each other.

In this case, the first groove and the second groove, each having a different depth, can be formed with good accuracy.

Thereby, the optical fiber and the optical semiconductor device are firmly supported by the grooves, and thus their distance is not expanded. Therefore, a structural defect of the optical coupling device can be overcome, but the optical coupling efficiency is not lowered. In addition, even if the adhesive (for example, solder) applied on the first groove overflows into the optical coupling region, it flows into the bottom of the third groove, so that the optical coupling is not blocked.

Also, according to the still further present invention, since a flat making film, which is uniformly pasted on the surface of the substrate, is formed so as to cover the first groove in advance before a metal pattern is formed on the second groove, the patterning by the photolithography method can be effected easily even if the first deep groove is formed.

Further, according to the another present invention, the projection having the trapezoid sectional shape is formed on the optical semiconductor device. A fitting groove having a reverse trapezoid sectional shape to be fitted to the projection of the optical semiconductor device is also formed on the substrate. An electrode is formed on the top surface of the projection of the optical semiconductor device. A metal pattern for bonding the electrode on the projection pf the optical semiconductor device thereon is formed on the bottom surface of the fitting groove of the substrate. The metal pattern is formed wider than the electrode.

As described above, the solder, upon melting it, spreads into the metal patterns, so that the melted solder serves to draw the electrodes toward the metal pattern. As a result, since the projection of the optical semiconductor device and the groove of the substrate are contacted by their slant faces, the optical semiconductor device is positioned to the substrate with high accuracy in both lateral and vertical directions. Further, heat generated in the optical semiconductor device is radiated to the substrate through the solder and the metal patterns.

BRIEF DESCRIPTION OF THE DRAWINGS

FIG. 1A is a perspective view showing the first conventional optical parts fixing device;

FIG. 1B is a plane view showing a part of the same in FIG. 1A;

FIGS. 13A to 13F are plane views showing steps for manufacturing an optical parts fixing device according to the second embodiment of the present invention;

FIG. 14 is a cross-sectional view showing a situation where parts are fitted into the optical parts fixing device according to the second embodiment of the present invention;

DESCRIPTION OF THE PREFERRED EMBODIMENTS (First Embodiment)

Figure 2A:
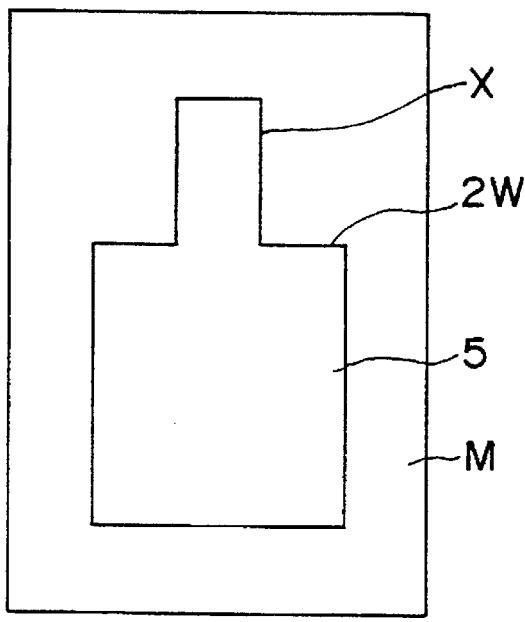
FIG. 2A is a perspective view showing the second conventional optical parts fixing device.
Figure 2B:
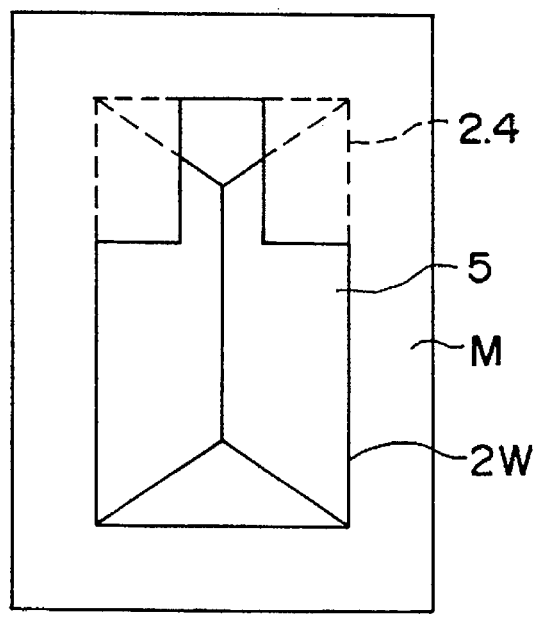
FIG. 2B is a plane view showing a part of the same in FIG. 2A.
Figure 3A:
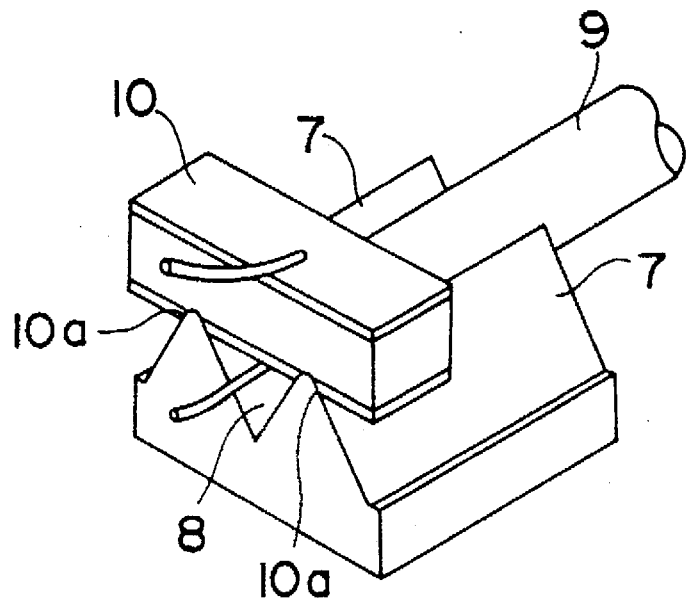
FIG. 3A is a perspective view showing the third conventional optical parts fixing device.
Figure 3B:
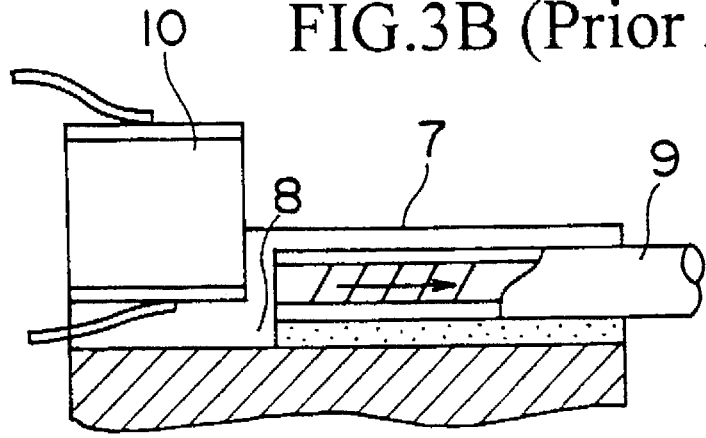
FIG. 3B is a plane view showing a part of the same in FIG. 3A.
Figure 4A:
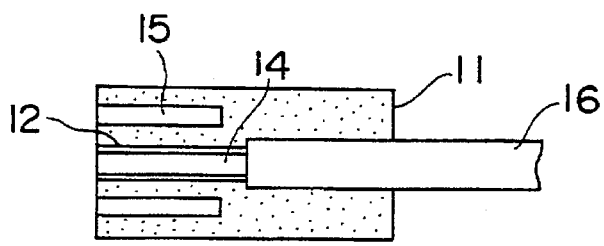
FIGS. 4A and 4B are cross-sectional views respectively showing the third conventional optical parts fixing device.
Figure 4B:
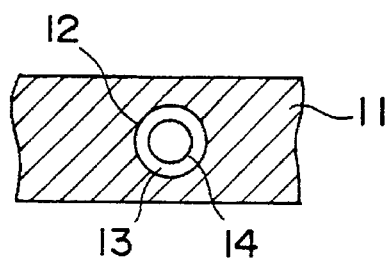
Figure 5A:
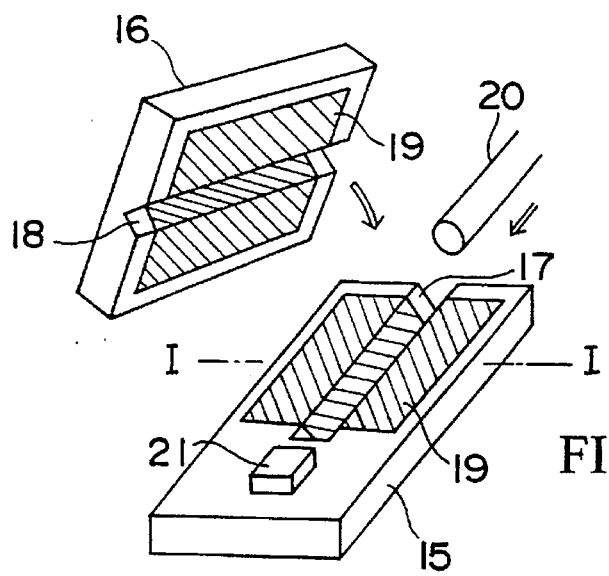
FIG. 5A is an assembling perspective view showing the fourth conventional optical parts fixing device.
Figure 5B:
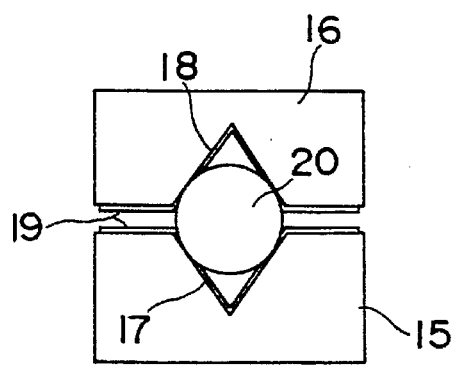
FIG. 5B is a cross-sectional view showing a sectional shape viewed from the line I—I in FIG. 5A.
Figure 6A:
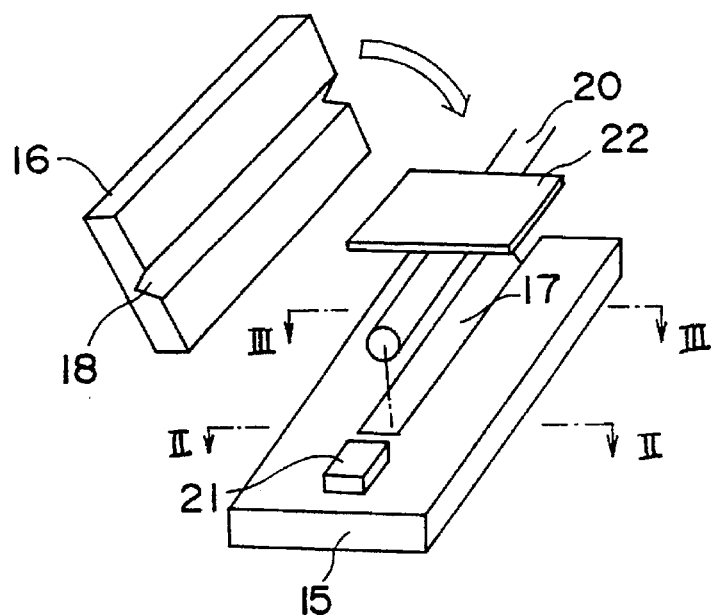
FIG. 6A is an assembling perspective view showing the fifth conventional optical parts fixing device.
Figure 6B:
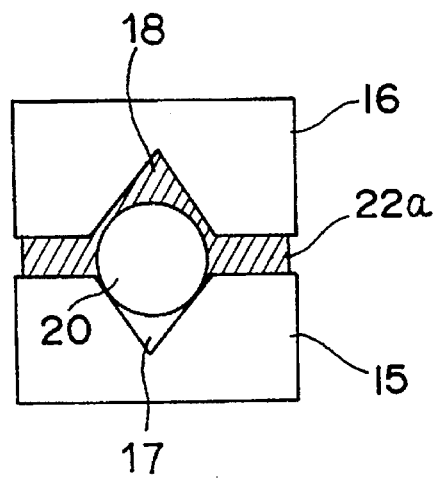
FIG. 6B is a cross-sectional view showing a sectional shape viewed from the line II—II in FIG. 6A.
Figure 6C:
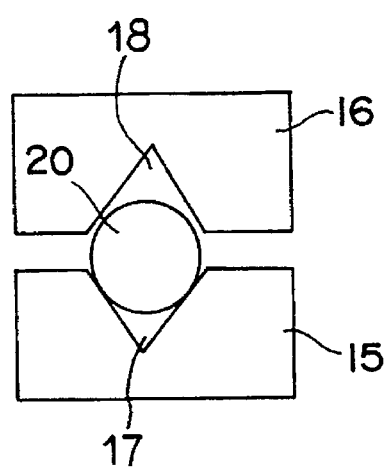
FIG. 6C is a cross-sectional view showing a sectional shape viewed from the line III—III in FIG. 6A.
Figure 7A:
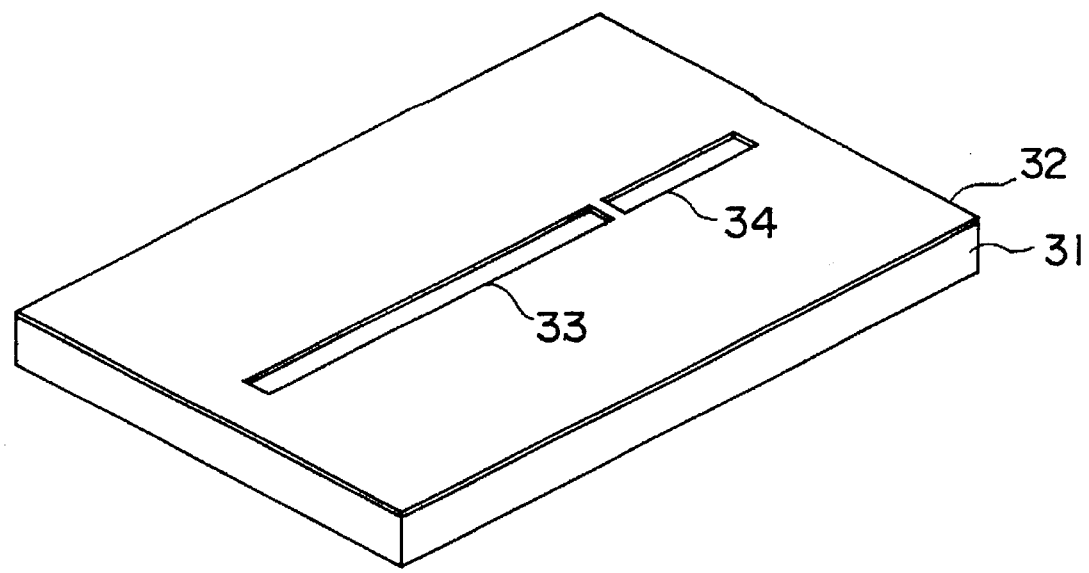
FIGS. 7A and 7B are perspective views showing steps for manufacturing an optical parts fixing device according to the first embodiment of the present invention.
Figure 7B:
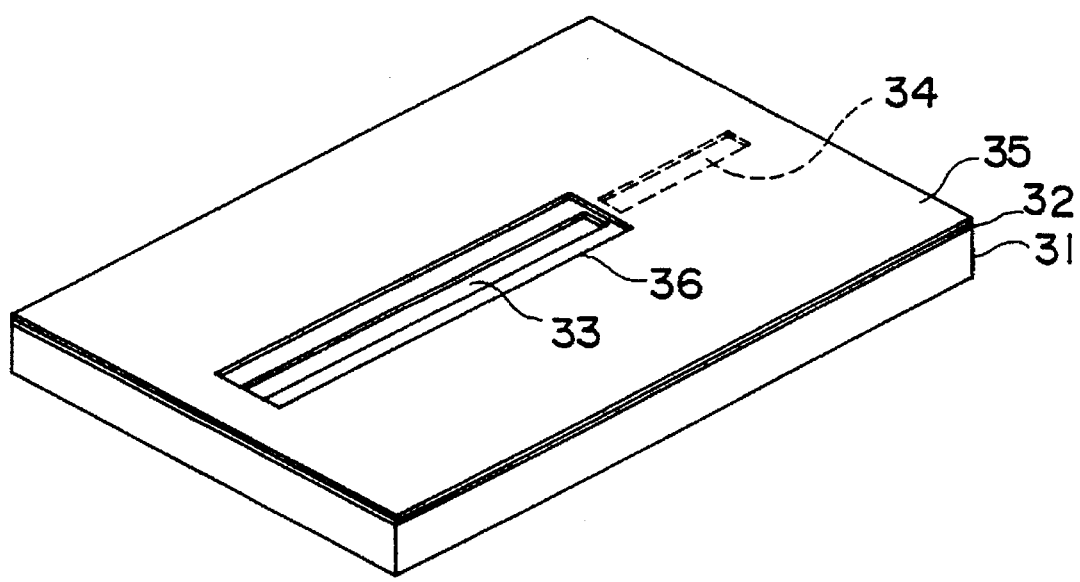

FIGS. 7A and 7B are perspective views showing steps for manufacturing an optical parts fixing device according to the first embodiment of the present invention. FIGS. 8A to 8F are plane views showing the same.

First, as shown in FIG. 7A, an $SiO_2$ film (making film) 32 having a thickness of 1 μm is formed by wet-oxidizing a (100) plane of a silicon substrate 31. A thermal oxidation is effected at a temperature 1100° C. for an hour. Subsequently, two stripe-shape windows 33, 34 are formed at a certain distance on a straight line by means of the photolithography method. The first window 33 has a width 150 μm and a length 5 mm. The second window 34 has a width 150 μm and a length 1 mm. The distance therebetween is 50 μm.

In case the first windows 33 and the second window 34 are formed, a relative accuracy in location therebetween is improved by using one photomask. Specifically, a relative error in location between the first windows 33 and the second window 34 becomes less than 0.1 μm which is equal to a drawing accuracy of the mask.

Then, as shown in FIG. 7B, a silicon nitride film (insulating film) 35 having a thickness of 0.2 μm is formed by the thermal CVD method so as to cover both the $SiO_2$ film 32 and the windows 33 and 34. Subsequently, the third window 36 is formed by patterning the silicon nitride film 35 by means of the photolithography method to selectively open the first window 33 and its peripheral portion. In this case, the second window 34 is covered with the silicon nitride film 35 as it is.

A growth temperature used when forming the silicon nitride film 35 is set more than 900° C. Otherwise, the silicon nitride film 35 is heated at the temperature of more than 900° C. after it is grown at the temperature of less than 900° C. Thereby, the silicon nitride film 35 can have such film quality that cannot be solved by KOH aqueous solution and an etchant used for the $SiO_2$ film 32.

In this first embodiment, since the silicon nitride film 35 is formed on the $SiO_2$ film 32, there is no situation where, due to the stress caused by the film formed on the silicon substrate 31, the silicon substrate 31 is etched abnormally, or cracks are caused on the silicon substrate 31.

Figure 8A:
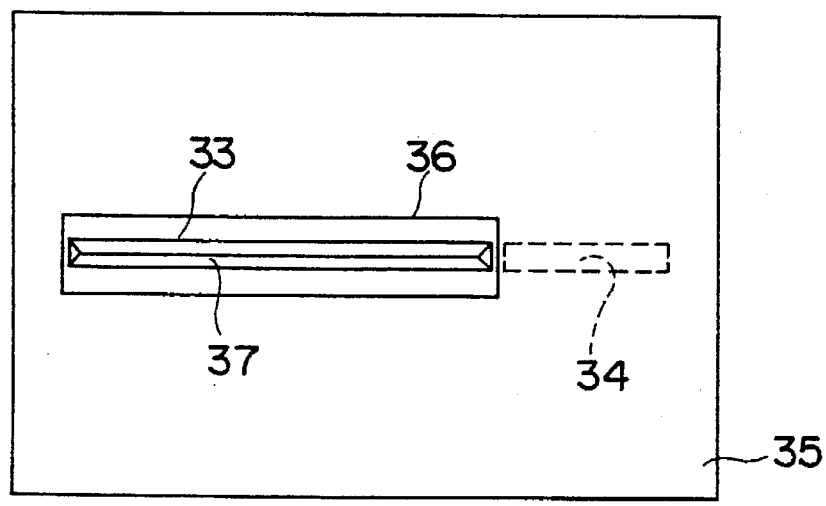
FIGS. 8A to 8D are plane views showing steps for manufacturing the optical parts fixing device according to the first embodiment of the present invention.

After this, when the silicon substrate 31 exposed from the first window 33 is etched by a KOH aqueous solution of 80° C. and 30 weight % for 100 minutes, the first groove 37 having the V-shaped sectional shape is formed on a portion exposed from the first window 33, as shown in FIG. 8A.

Then, the silicon nitride film 35 is removed by the wet-etching using the boiled phosphoric acid. Thus the second window 34 is exposed.

Figure 8B:
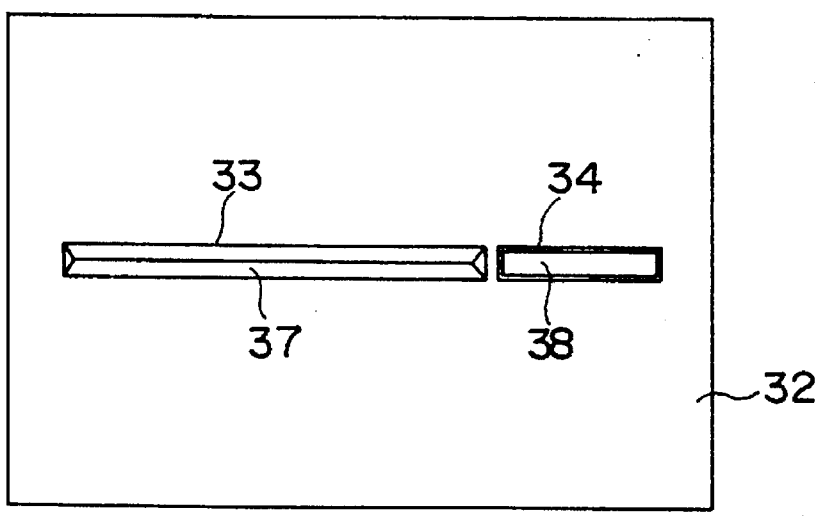

Subsequently, as shown in FIG. 8B, when the silicon substrate 31 exposed from the second window 34 is etched by the KOH aqueous solution of 80° C. and 30 weight % for 15 minutes, the second groove 38 having an inverse trapezoid sectional shape is formed on the silicon substrate 31 exposed from the second window 34. At this time, the second groove 38 is formed to have a depth of 15 μm. Thereby, the second groove 38 is formed shallower than the first groove 37.

In this manner, since the first groove 37 and the second groove 38 are formed by an individual etching process, they can be controlled so as to obtain their different depths, respectively.

Figure 8C:
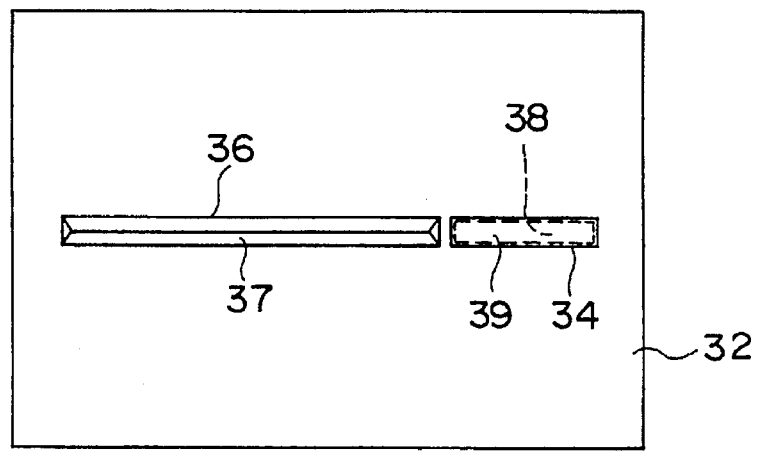

After completing such groove forming steps, a silicon nitride film 39 having a thickness of 0.2 μm is formed on the $SiO_2$ film 32 by the plasma CVD method, the first groove 37 and the second groove 38. Thereafter, while covering a certain area of the silicon nitride film 39 on the second groove 38 by the photoresist, the silicon nitride film 39 and the $SiO_2$ film 32 are removed by a buffer hydrofluoric acid. Then the photoresist is removed. Consequently, as shown in FIG. 8C, only the second groove 38 is covered with the silicon nitride film 39 and the $SiO_2$ film 32.

The silicon nitride film may be left on the substrate. Because the film is thin and the stress caused by the film formed by plasma CVD is negligible.

Figure 8D:
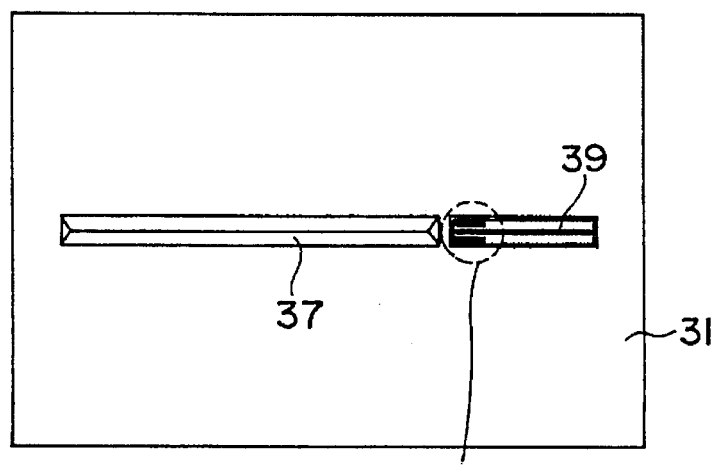
Figures 1, 8D:
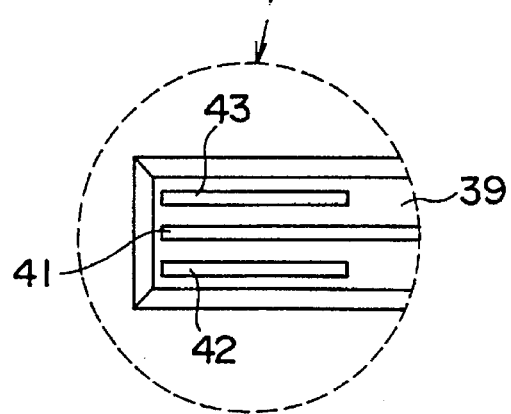

Next, a titanium (Ti) and a platinum (Pt) are formed by the vacuum evaporation on the silicon substrate 31 and the silicon nitride film 39. Then, as shown in FIG. 8D, by patterning these metals by means of the photolithography method, three metal patterns 41 to 43 are formed on the silicon nitride film 39 covering the second groove 38. The central metal pattern 41 is formed longer than side metal patterns 42 and 43 so as to extend to the external.

If the dry film type photoresist is used to form the metal patterns 41 to 43, the photolithography step is made simple.

Figure 8E:
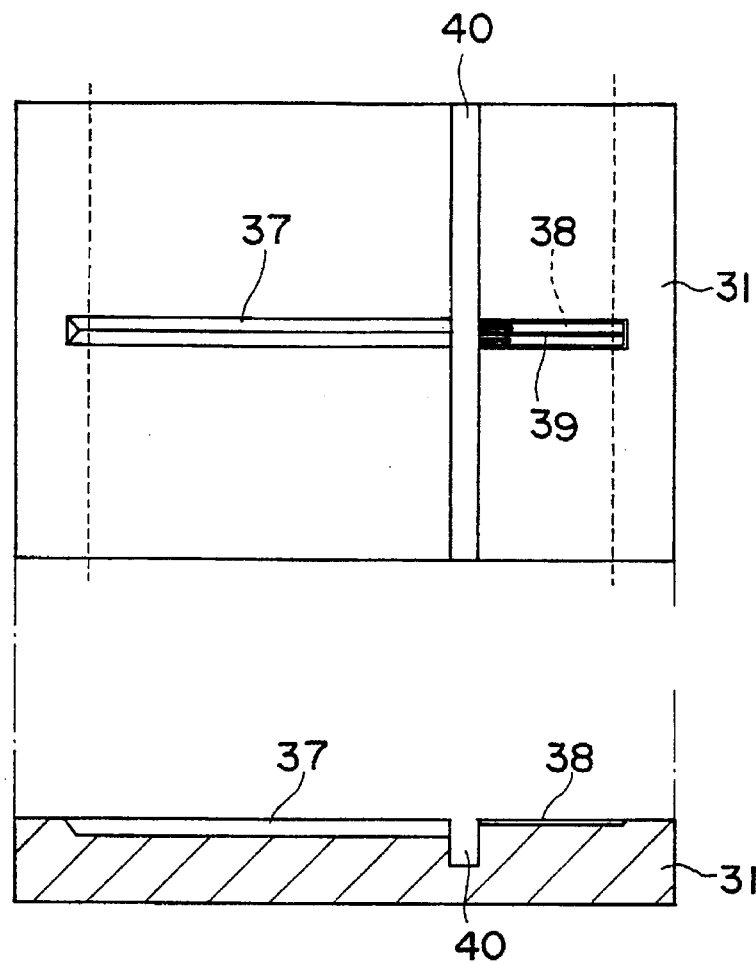
FIG. 8E is a plane view and sectional view showing steps for manufacturing the same.

After this, as shown in FIG. 8E, the third groove 40 is formed between the first groove 37 and the second groove 38 by using the dicing saw. The third groove 40 is formed in the direction perpendicular to the line connecting the first groove 37 to the second groove 38. A depth of the third groove 40 is not shallower than the depths of the first groove 37 and the second groove 38, rather preferably deeper than them. The third groove 40 is formed on an area in which opposed one end portions of the first groove 37 and the second groove 38 are included, so that both one end portions of the first groove 37 and the second groove 38 are coupled via the third groove 40. Thus it is easy to form the groove with ±2 μm accuracy.

Now, FIG. 8E shows an upper surface and a side sectional shape of the silicon substrate 31.

Subsequently, both ends of the silicon substrate 31 are cut off by moving the dicing saw along two lines, each passing respective outer end portion of the first groove 37 and the second groove 38. Therefore, the cutting direction is perpendicular to the line connecting the first groove 37 to the second groove 38.

With the above, the formation of the substrate to which the optical fiber and the optical semiconductor device are fixed is completed.

Figure 8F:
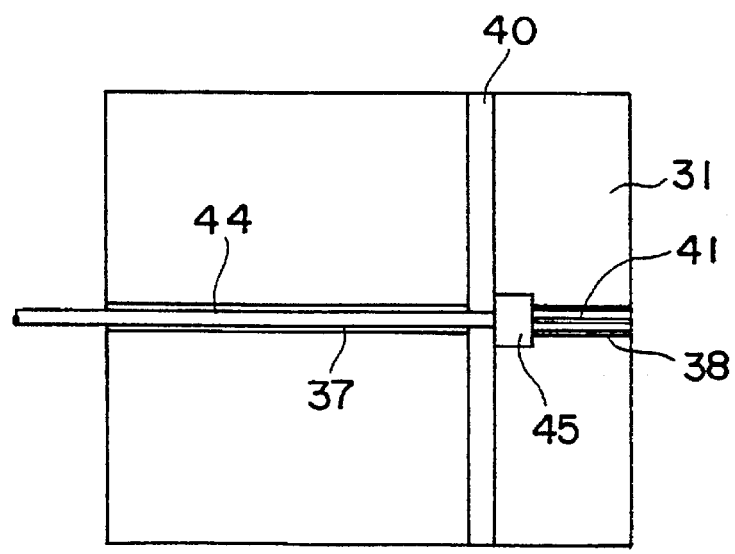
FIG. 8F is a plane view showing steps for manufacturing the same.

Next, as shown in FIG. 8F, by fitting the optical fiber 44 into the first groove 37 and fitting the optical semiconductor device 45 into the second groove 38, respectively, an end portion of the core of the optical fiber 44 is placed opposite to the active region of the optical semiconductor device 45.

When the optical fiber 44 is fixed into the first groove 37 by the adhesive or solder, there are some situations where the adhesive or the melted solder projects from the first groove 37 and reaches the inside of the third groove 40. In this case, the melted solder, when pushed out by the optical fiber 44, flows toward the lower surface of the third groove 40 and then spreads in the lateral direction. Thus the melted solder never fills up a space between the optical fiber 44 and the optical semiconductor device 45. In addition, between the optical fiber 44 and the optical semiconductor device 45, there exists no obstacle preventing them from being contacted. Accordingly, an optical coupling between the optical fiber 44 and the optical semiconductor device 45 is improved.

Now, a process of fitting the optical semiconductor device 45 into the second groove 38 will be explained.

Figure 9A:
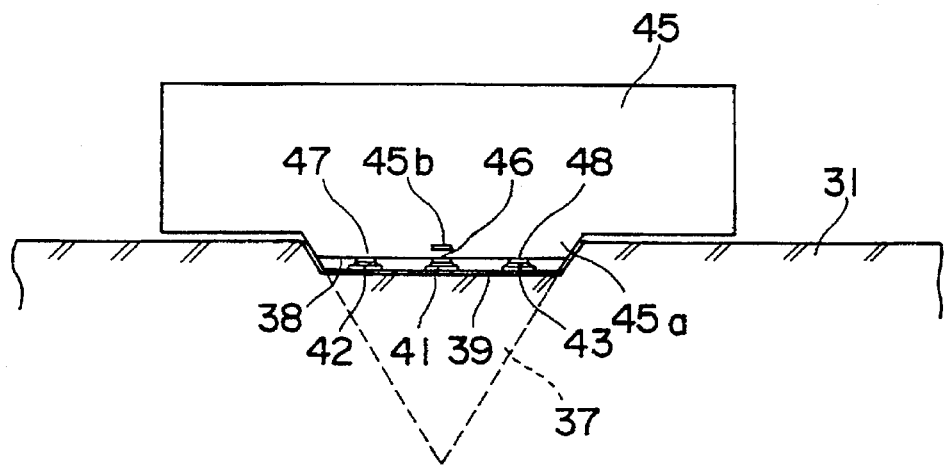
FIGS. 9A to 9C are side views showing situations where an optical semiconductor device is fixed by the optical parts fixing device according to the first embodiment of the present invention.

As shown in FIG. 9A, a projection 45a having a trapezoid sectional shape, which must be fitted into the second groove 38 having an inverse trapezoid sectional shape on the silicon substrate 31, is formed on the optical semiconductor device 45. The projection 45a is so constructed, by the photolithography method and the wet-etching process, that an active layer 45b of the optical semiconductor device 45 is positioned at a center. When the projection 45a and the second groove 38 are fitted to each other, an angle of the slant face of the projection 45a is identical to an angle of both slant faces of the second groove 38. If the optical semiconductor device 45 is formed of GaAs system, InP system etc., the same angle as that of the slant face of the second groove 38 can be formed in the semiconductor device 45.

The optical semiconductor device 45 and the second groove 38 are fitted to each other by contacting the slant faces of the device 45 to the slant faces of the second groove 38. Therefore, if the accuracy of the width of the second groove 38 is improved, there occurs no problem even when its depth is slightly varied.

The height of the projection 45a is, for example, 15 μm. Under such condition that the projection 45a is fitted into the second groove 38, widths of the second groove 38 and the projection 45a are controlled so as to produce a clearance of 5 μm between the flat surface of the projection 45a and the bottom face of the second groove 38.

The optical semiconductor device 45 is a semiconductor laser formed on the InP substrate, for example. Note that the semiconductor laser of mode conversion type which is used together with the taper waveguide having a thin thickness and a wide width in its optical output terminal side may be used as this semiconductor laser. This semiconductor laser has been recited in the preprint of lecture No. C-182, Autumn Conference 1993, IEICE (Institute of Electronics, Information and Communication Engineers).

Figure 9B:
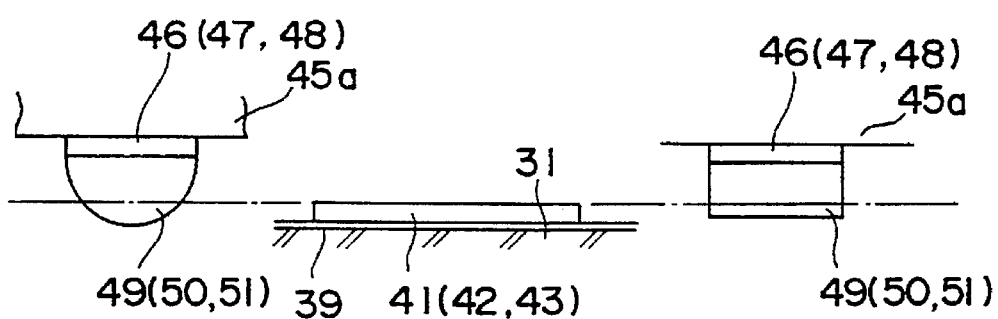

Stripe-shape electrode patterns 46 to 48, each having a width of 10 μm and made of Ti and Pt by the vacuum evaporation, are disposed at a certain distance on the contact layer (not shown) exposed from the flat face of the projection 45a of the optical semiconductor device 45. With the sectional shape shown in left or right side of FIG. 9B, pellets 49 to 51, each of which is made of eutectic alloy of Au and Sn and has a width of 10 μm and a thickness of 10 μm, are formed by the vacuum evaporation on the electrode patterns 46 to 48. These pellets 49 to 51 are formed like a stripe-shape along with electrode patterns 46 to 48, respectively.

As shown in FIG. 9A, by melting AuSn pellets 49 to 51 formed on the projection 45a by a heating process while contacting them to three metal patterns 41 to 43 on the second groove 38, and then cooling them to fuse into the patterns 41 to 43, the second groove 38 and the projection 45a are contacted to each other with their slant faces and are thus fixed.

Figure 9C:
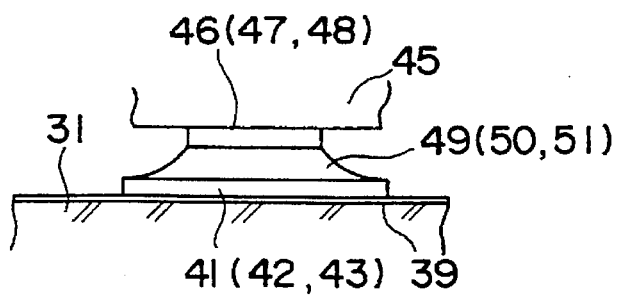

As shown in FIG. 9C, widths of the metal patterns 41 to 43 on the second groove 38 is set in advance larger than those of the electrode patterns 46 to 48, so that the AuSn pellets 49 to 51 are controlled to obtain an appropriate amount thereof. As a result, top portions of the AuSn pellets 49 to 51, if each having a clearance of about 5 μm against the metal patterns 41 to 43, are connected to the patterns 41 to 43 when they are melted.

Further, as shown in FIG. 9C, when the melted pellets 49 to 51 dip the metal patterns 41 to 43, AuSn solders composing the metal patterns 41 to 43 spread into the lateral direction of the metal patterns 41 to 43 to thus become thin. Thus a tensile force serves to draw the optical semiconductor device 45 toward the silicon substrate 31. In this case, a volume of the solder must be determined such that the tensile force acts to cause such drawing effect. Therefore, too much or too less the volume of the solder cannot result in the good tensile force.

According to the above functions, they are contacted firmly by their slant faces shown in FIG. 9A. Even if the height of the projection 45a of the optical semiconductor device 45, the depth of the second groove 38, the thicknesses of the metal patterns 41 to 43, and the thicknesses of the AuSn pellets 49 to 51 are slightly changed, the optical semiconductor device can be mounted with constant accuracy.

As described above, since the optical semiconductor device 45 and the silicon substrate 31 are contacted to each other via the AuSn solder in plural points, not only the connecting electrodes can be surely contacted, but also the heat generated in the optical semiconductor device 45 can be transferred to the silicon substrate 31 via the AuSn solder.

An example of an optical transmitting and receiving device (phototransceiver), to which the optical coupling substrate constructed as above is applied, will be described with reference to FIGS. 10A and 10B hereinbelow.

The first grooves 37a and 37b having the V-shaped sectional shape and the second grooves 38a and 38b having the inverse trapezoid sectional shape, both having the same structure as described above, are formed on the upper surface of the silicon substrate 52. Two optical fibers 44a and 44b to be passed through a fiber coupler 60, the semiconductor laser 45a and the edge incident type photodetector 45b are fixed in the manner described above.

In this case, the edge incident type photodetector 45b has the same projections (not shown) as described above, and a plurality of pellets are formed on its flat surface in the same manner. As the edge incident type photodetector 45b, a photodetector having a thick photoabsorption layer disclosed in, for example, the preprint of lecture No. C-280, Spring Conference 1993, IEICE is used.

The silicon substrate 52 is put in a metal package 53 which has a feed-through 54 for inputting/outputting an electric signal. The second substrate 56, to which integrated circuits 55a and 55b for electronic circuits are attached, is arranged in parallel to the silicon substrate 52 in the metal package 53. Metal patterns 41a, 41b on the second grooves 38a, 38b of the silicon substrate 52 and metal patterns 56a, 56b on the second substrate 56 are connected mutually via gold wires 57. A bi-directional communication is conducted by connecting either of two optical fibers 44a and 44b to the optical fiber of the subscriber's system.

According to this example, even when optical couplings between two optical fibers 44a and 44b and the semiconductor laser 45a and the photodetector 45b are conducted without an adjustment, a high optical coupling efficiency can be achieved. In addition, an advantage to the effect that the device may be made small in size is obtained.

Moreover, in this optical transmitting and receiving device, since optical coupling portions to which a location adjustment is needed are merely top portions of the optical fibers 44a and 44b and one portions of the optical semiconductor devices 45a and 45b, a loss becomes very low. Specifically, a connection loss between the semiconductor laser 45a and the optical fiber 44a is 1 dB. A connection loss between the photodetector 45b and the optical fiber 44b is 0.3 dB. An excess loss of the fiber coupler 60 is 0.1 dB. A splicing loss between the optical fibers 44a and 44b and other optical fibers is. As a result, the optical transmitting and receiving device achieving a very low loss can be obtained.

Figure 10A:
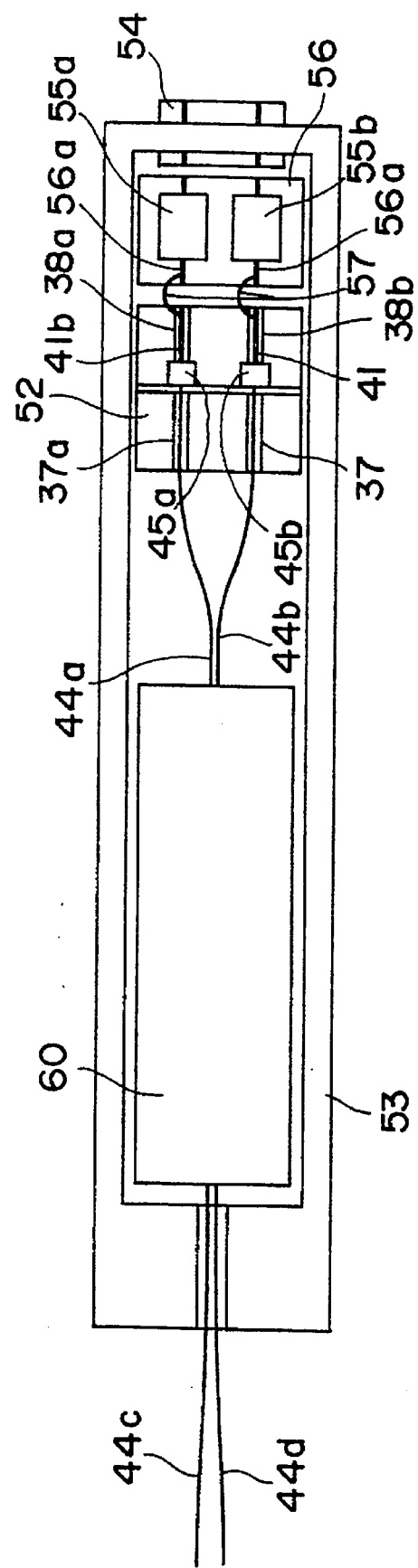
FIG. 10A is a plane view showing the first example of an optical module in which the optical parts fixing device according to the first embodiment of the present invention is applied.
Figure 10B:
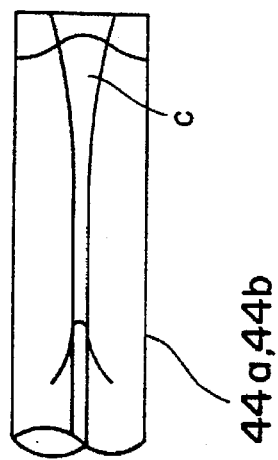
FIG. 10B is a cross-sectional view showing a top portion of the optical fiber used in the first embodiment of the present invention.

As shown in FIG. 10B, if an optical fiber having a core C spreading like a taper shape at its top portion is used as the optical fibers 44a and 44b, the coupling efficiency can be improved. This fact is not limited to this embodiment. Such optical fiber can be applied to following embodiments in the same manner.

Figure 11:
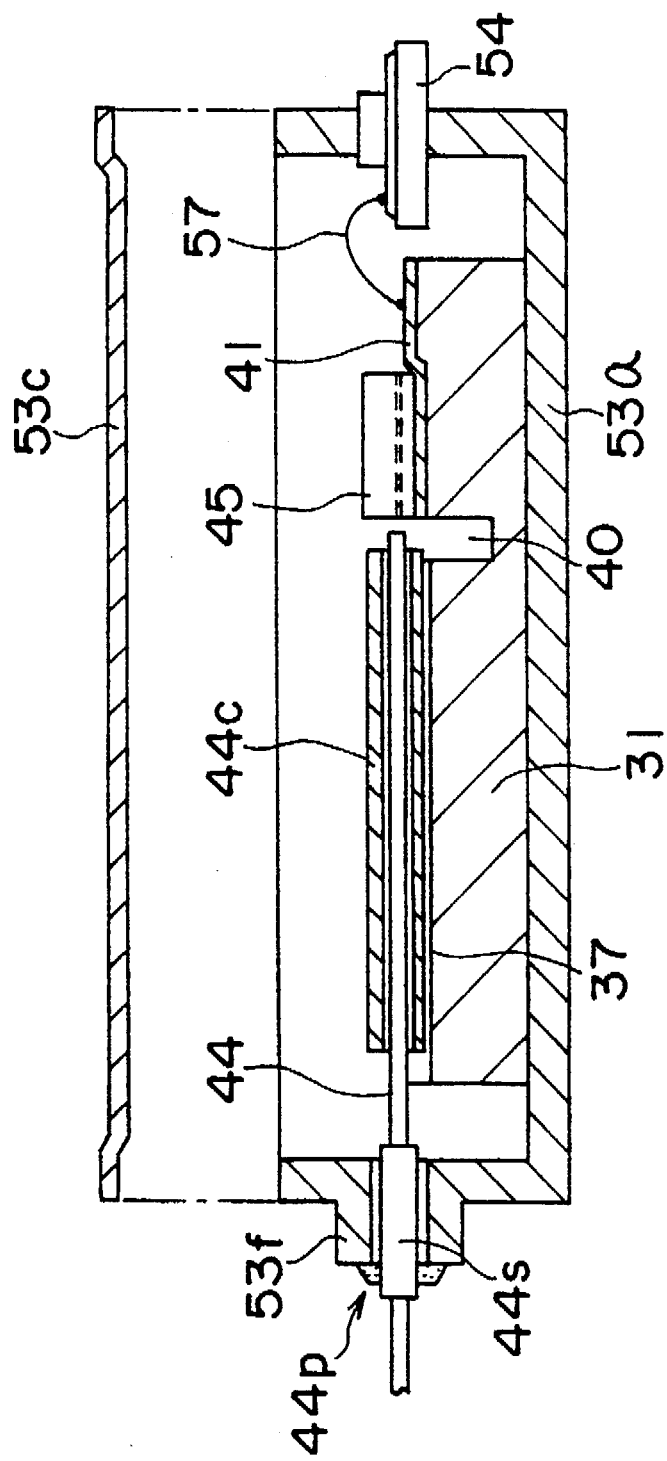
FIG. 11 is a cross-sectional view showing the second example of an optical module to which the optical parts fixing device according to the first embodiment of the present invention is applied.

Next, FIG. 11 shows an example wherein a hermetic seal can be performed easily.

In this example, the first groove 37, the second groove 38, the third groove 40 and the metal patterns 41 to 43 are formed on the silicon substrate 31. Also, the semiconductor laser 45 and a glass capillary 44c having a 126 μm hole therein are mounted on the silicon substrate 31. The substrate 31 is bonded to the metal package 53a by Sn solder. A wiring 41 and the feedthrough 54 are connected by a gold wire 57 by means of wire bonding. An outer diameter of the glass capillary 44c is 250 μm. The glass capillary 44c is fixed by the adhesive. The optical fiber 44 having a metal sleeve 44s is inserted from a hole of a flange 53f in the right side of the package 53a so as to approach its top to the semiconductor laser 45. Thereafter, the flange 53f and the outer end portion 44p of the metal sleeve 44s is welded by the seam welding using the YAG laser. Then, in a nitrogen atmosphere, a cover 53c is put on the package 53a and the circumference of the device is hermetically sealed up by the resistance welding.

In this embodiment, an adjustment of the optical fiber 44 in the direction perpendicular to the optical axis can be omitted because of the glass capillary 44c, so that the alignment in location becomes easy. The optical fiber 44 is hold firmly during the YAG welding to seal it up. And, in this embodiment, since the hermetic seal is obtained by the YAG welding, the optical fiber 44 and the capillary 44c is fixed enough by the adhesive.

Note that, in case this embodiment is used in the optical coupling array, the first groove 37 can be formed in array fashion, the capillary formed in array fashion can be used, and also the semiconductor laser formed in array fashion can be used.

In addition, according to the above embodiments except for FIGS. 10A and 10B, for example, several hundreds pair of the first grooves 37 and the second grooves 38 are formed on the silicon substrate 31 having a diameter of 8 inch. The AuSn pellets formed on the surfaces of several hundreds of the semiconductor lasers are temporarily fixed to the metal patterns 41 to 43 to mount on several hundreds of the second grooves 38. Then, by heating the whole structure up to 300° C., several hundreds of the semiconductor lasers can be aligned simultaneously by the second grooves 38. After this, several hundreds of the glass capillary 44c are fixed to the first grooves 37. Then, the resultant structure is divided into each chip by the dicing saw. The hermetic seal is effected in the manner shown in FIG. 11. With the above, a mass production of the optical terminal devices can be attained readily by the batch process in wafer unit.

Figure 12A:
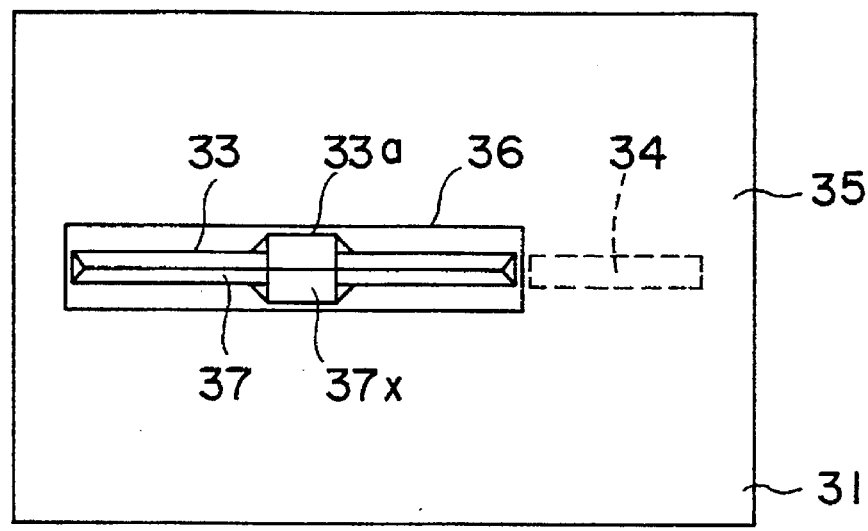
FIGS. 12A and 12B are plane views showing situations where an extension groove is attached to the optical fiber fixing groove in the optical parts fixing device according to the first embodiment of the present invention
Figure 12B:
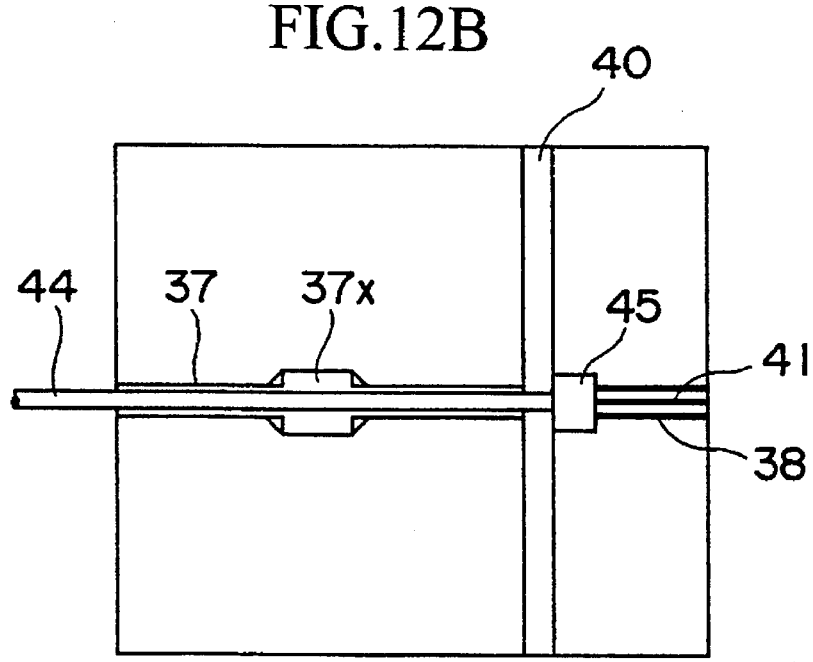

As shown in FIG. 12A, the mask of the SiO$_2$ film can be modified such that a projection 33a having a width wider than that of the first window 33 is formed on part of the first window 33. Thereby, an extension portion 37x having a depth and a width, each being deeper and wider respectively than those of the first groove 37, is formed on part of the first groove 37 formed on the upper surface of the silicon substrate 31. Consequently, as shown in FIG. 12B, upon fixing the optical fiber 44 to the silicon substrate 31, the optical fiber 44 can be bonded to the extension portion 37x by supplying the solder to the extension portion 37x only. Details of the above will be explained in the sixth embodiment.

(Second Embodiment)

In the first embodiment described above, the trapezoid projection is formed on the optical semiconductor device. And the groove to be fitted into the projection is formed on the silicon substrate. However, the following structure may be adopted to align the optical semiconductor device.

Next, such structure will be explained along with its manufacturing processes.

Figure 13A:
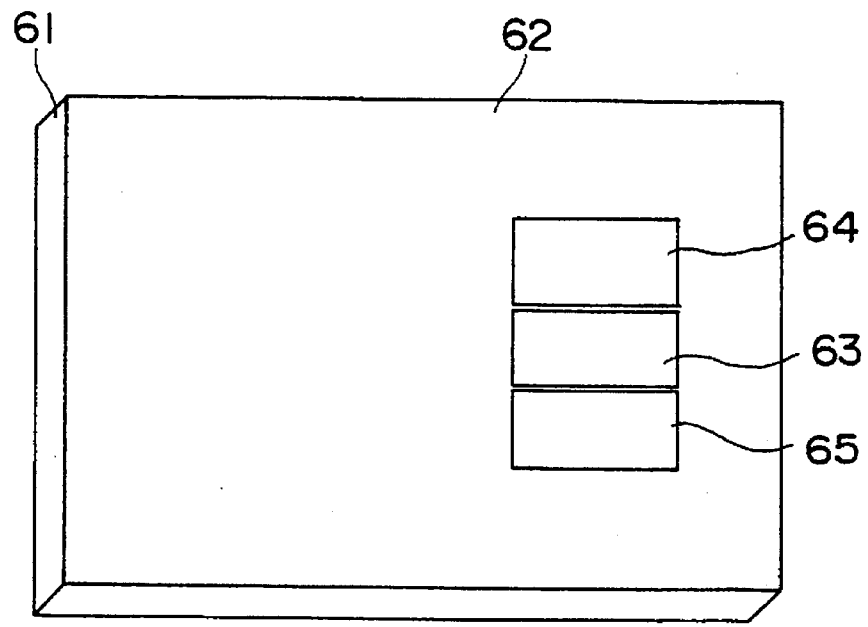

First, as shown in FIG. 13A, a (100) plane of the silicon substrate 61 is thermally oxidized to form an SiO$_2$ film (making film) 62 of 0.3 μm in thickness thereon. Then the SiO$_2$ film 62 is patterned by the photolithography method so that three windows 63 to 65, each having a planar rectangular shape, are formed at a distance of 100 μm on an optical semiconductor fixing area and its periphery. The three windows 63 to 65 are arranged in the direction perpendicular to the light waveguide direction.

Figure 13B:
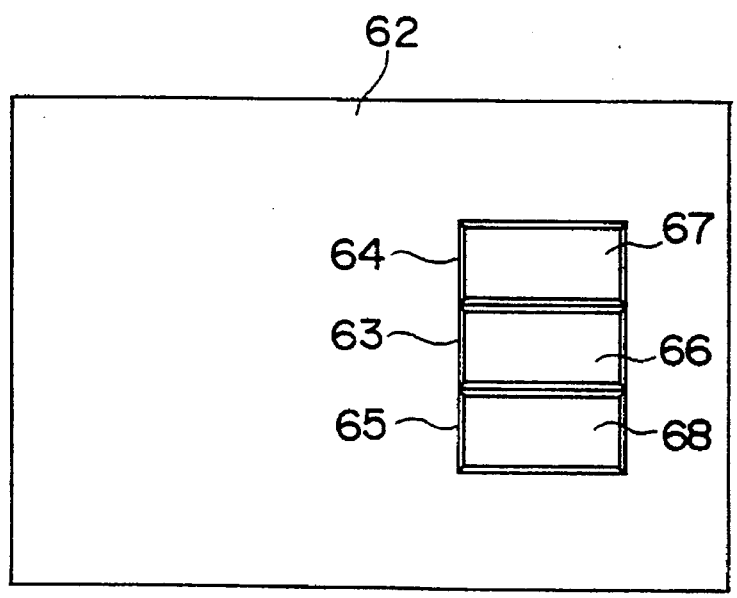

After this, as shown in FIG. 13B, the silicon substrate 61 exposed from the windows 63 to 65 is wet-etched by a KOH aqueous solution to form the first to third grooves 66 to 68, each having an inverse trapezoid sectional shape. The wet-etching is conducted to obtain a depth of 15 μm under the same condition as that used for forming the second groove 38 in the first embodiment.

Figure 13C:
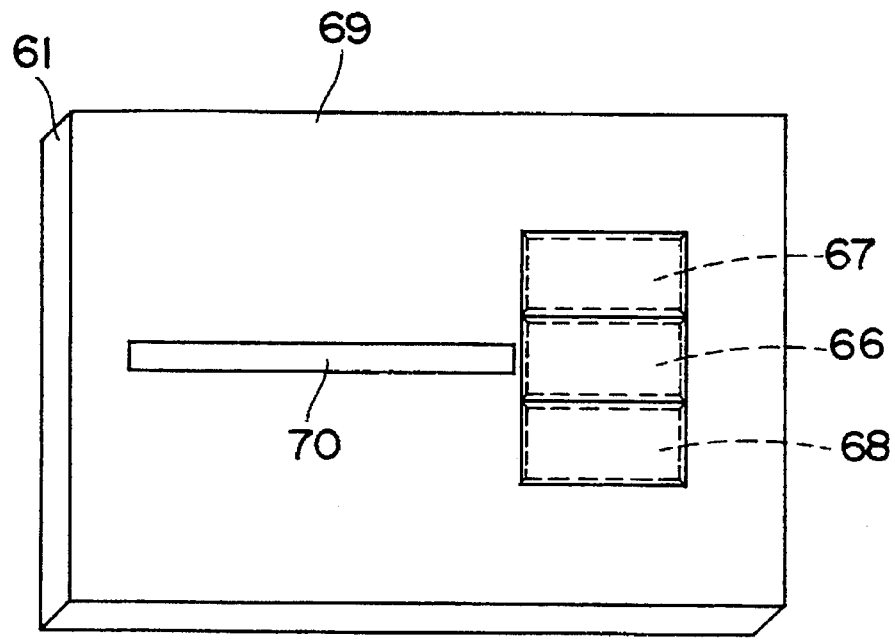
Figure 13D:
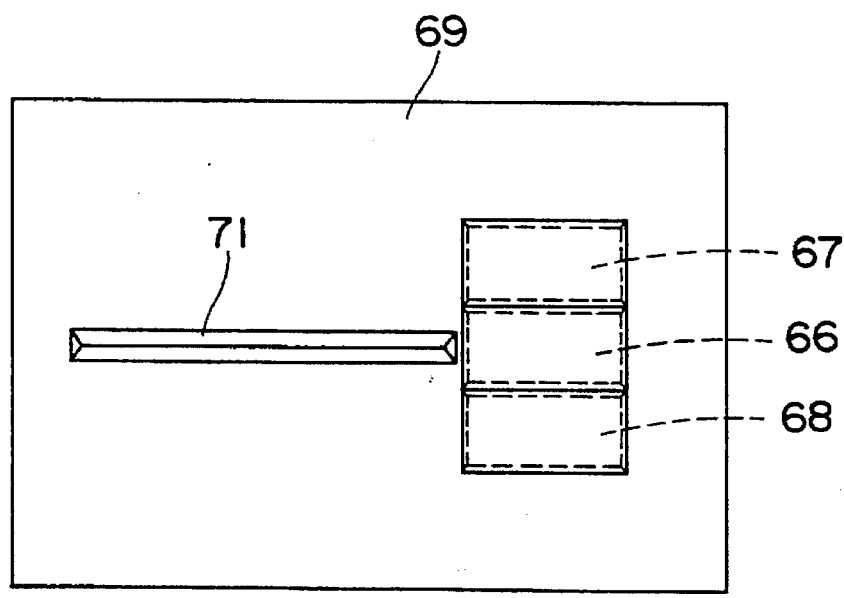

Then, after the SiO$_2$ film 62 is removed by the buffer hydrofluoric acid, the upper surface of the silicon substrate 61 is thermally oxidized again to form the second SiO$_2$ film 69 of 1 μm in thickness. Subsequently, as shown in FIG. 13C, the second SiO$_2$ film 69 is patterned by the photolithography method so as to form the fourth window 70 in the waveguide direction spaced apart from the second central groove 66. Subsequently, as shown in FIG. 13D, the silicon substrate 61 exposed from the fourth window 70 is wet-etched by the KOH aqueous solution to form a V-shaped groove 71 of 100 μm in depth. The wet-etching is conducted under the same condition as that used for forming the first groove 37 in the first embodiment.

Then Ti and Au are formed on the entire surface by the vacuum evaporation. These metal films are patterned by the photolithography method so as to form the first to third metal patterns 72 to 74, as shown in FIG. 13E, on the second groove 66 via the second SiO$_2$ film 66. In this case, the second central metal pattern 72 is extended toward the outside.

Thereafter, as shown in FIG. 13E, a fifth groove 75 is formed between the first to third grooves 66 to 68 and the V-shaped groove 71 by the dicing saw. The fifth groove 75 is formed in the direction perpendicular to the longitudinal direction of the V-shaped groove 71, and has a depth not shallower than that of the V-shaped groove 71. Thus the fifth groove 75 is formed so as to cross the end portions of the first to third grooves 66 to 68 and the V-shaped groove 71. As a result, the first to third grooves 66 to 68 and the V-shaped groove 71 is coupled to the side face of the fifth groove 75.

Subsequently, as shown by the dashed line in FIG. 13E, both ends of the silicon substrate 61 are cut off so as to cross the end portions of the first to third grooves 66 to 68 and the V-shaped groove 71 not coupled to the fifth groove 75.

As shown in FIG. 13F, an optical fiber 76 is fitted into the V-shaped groove 71 formed on the silicon substrate 61 by the steps described above. At the same time, the V-shaped grooves 77a and 77b formed on the optical semiconductor device 77 are fitted into two projection like, ridge shaped stripe 66a and 66b formed between the first to third grooves 66 to 68. In this manner, these optical parts are positioned.

The optical fiber 76 is fixed to the substrate 61 by the solder. As shown in FIG. 14, the optical semiconductor device 77 is fixed via the electrodes 78a to 78c on the optical semiconductor device 77, the metal patterns 72 to 74 on the silicon substrate 61, and the AuSn solder 79 to the substrate 61. These connections are the same as in the first embodiment shown in FIGS. 9A and 9C.

An angle of slant faces of the V-shaped grooves 77a and 77b formed on the optical semiconductor device 77 coincides with an angle of slant side faces of the first to third grooves 66 to 68. The V-shaped grooves 77a and 77b is different from those of the first embodiment in that, instead of removing the semiconductor layer around the trapezoid projection 45a in the first embodiment, the grooves are formed around the trapezoid projections.

This embodiment is identical to the first embodiment, except that the shape of the grooves 66 to 68 used for aligning the optical semiconductor device 77 are changed. The electrodes 78a to 78c on the optical semiconductor device 77 and the metal patterns 72 to 74 can be easily connected. In addition, like the first embodiment, heat generated in the optical semiconductor device 77 is transferred to the silicon substrate 61 via the solder 79.

Although, in this second embodiment, the windows 63 to 65 and 70 used for forming the first to third grooves 66 to 68 and the V-shaped Groove 71 are formed separately, these windows can be formed simultaneously and then the first to third windows can be covered with the silicon nitride film, like the first embodiment. According to this second embodiment, an alignment accuracy of the windows can be improved, like the first embodiment.

(Third Embodiment)

In the first embodiment, a lift-off method cannot be used when the metal patterns 41 to 43 are formed on the second groove 38. This is because, when the photoresist is used for the lift-off operation, the photoresist entered into the first groove 37 cannot be removed readily by the solvent since the first groove 37 having the V-shaped sectional shape is deep like 100 µm.

Therefore, when the metal patterns 41 to 43 must be formed by the lift-off method, the following steps are taken.

Figure 15A:
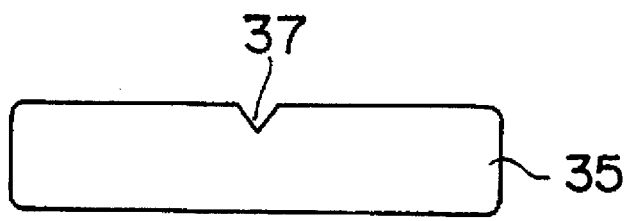
FIGS. 15A to 15D are cross-sectional views showing steps for manufacturing an optical parts fixing device according to the third embodiment of the present invention.

First, according to the method as already described in the first embodiment, the first groove 37 having a V-shaped sectional shape and the second groove 38 having an inverse trapezoid sectional shape are formed on the silicon substrate 35 (base wafer). A sectional shape of one part thereof is shown in FIG. 15A.

Figure 15B:
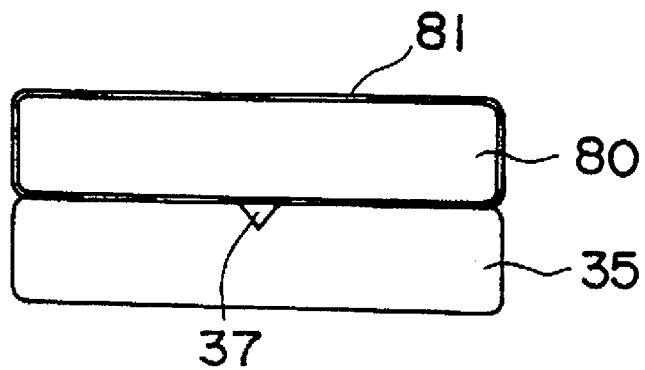

Then, as shown in FIG. 15B, the surface of the silicon substrate 35, on which the first groove 37 and the second groove 38 are formed, is cemented to one surface of the second silicon substrate (bond wafer) 80. An entire surface of the second silicon substrate 80 is covered with the SiO₂ film 81 of 1.0 µm in thickness.

Figure 15C:
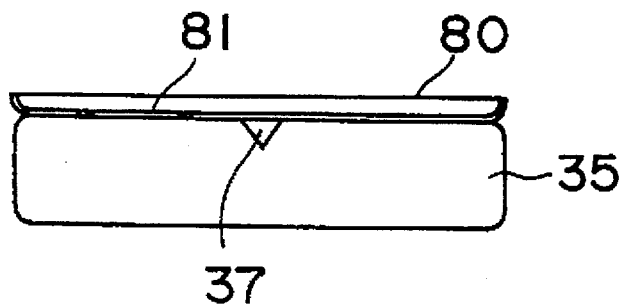
Figure 15D:
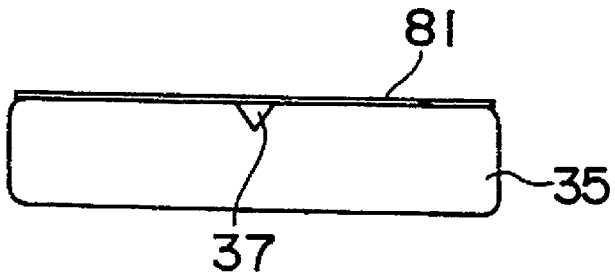

Subsequently, as shown in FIG. 15C, the other surface of the second silicon substrate 80 is ground. At the time when the substrate 80 becomes thin, it is etched by the KOH aqueous solution to remove it from the silicon substrate 35 used as the base wafer.

Figure 16:
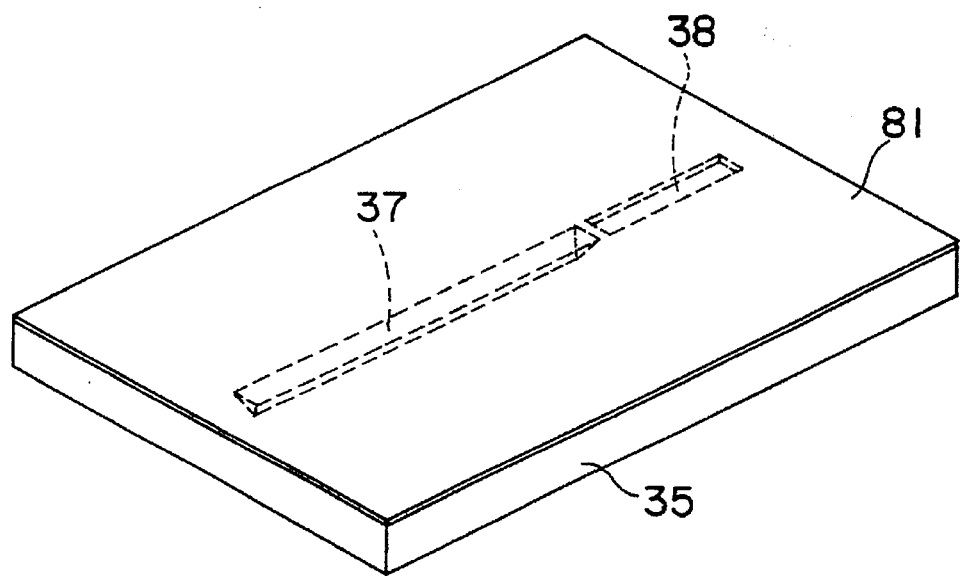
FIG. 16 is a perspective view showing steps for manufacturing the optical parts fixing device according to the third embodiment of the present invention.
Figure 17A:
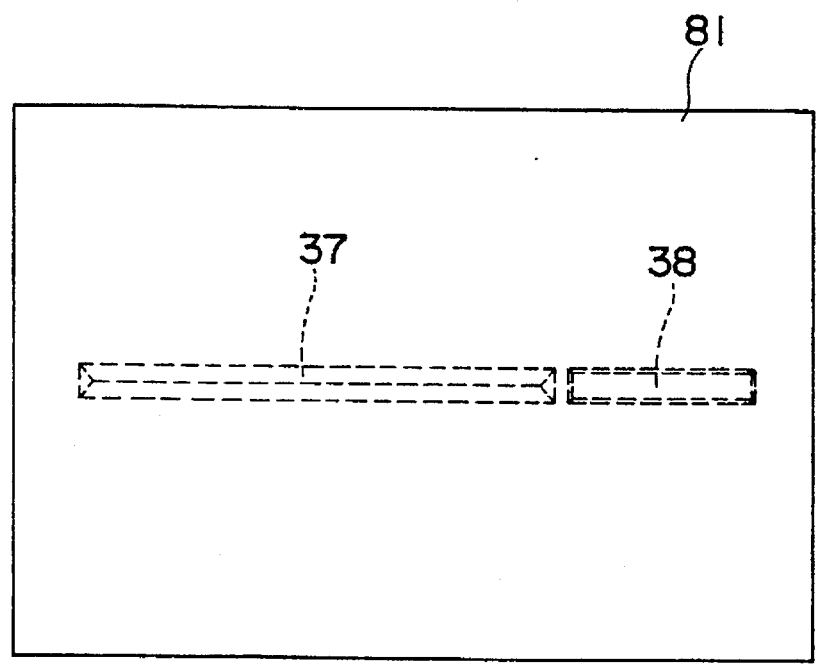
FIGS. 17A to 17C are plane views showing steps for manufacturing the same in FIG. 16.

Thus only the SiO₂ film 81 remains on the surface of the silicon substrate 35 used as the base wafer. FIG. 16 is a perspective view showing the silicon substrate 35 after the bond wafer 80 is removed. FIG. 17A is a plan view showing the same.

Figure 17B:
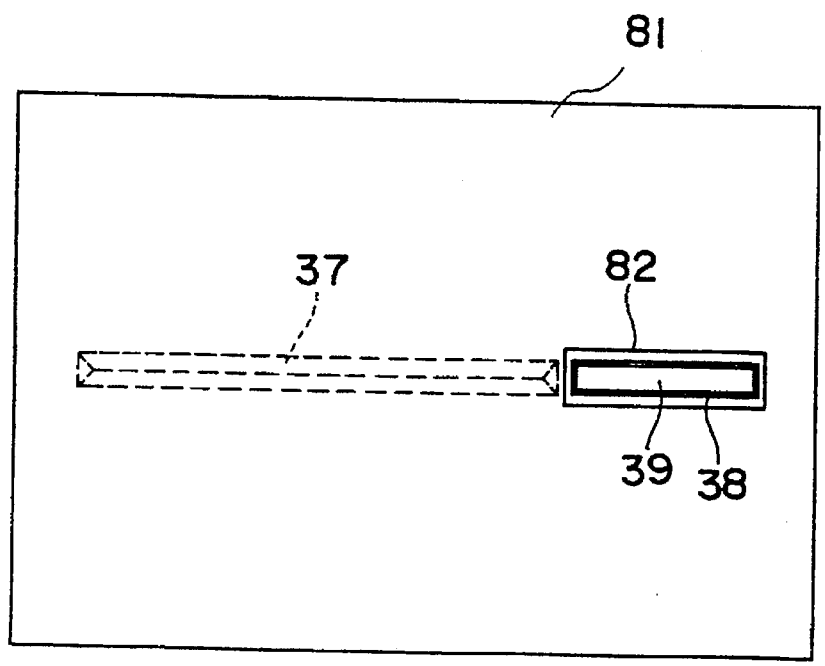

Next, as shown in FIG. 17B, the SiO₂ film 81 is patterned by the photolithography method to form a window 82 for exposing only the second groove 38. Subsequently, the silicon nitride film 39 is selectively formed only on the second groove 38 by the method described in the first embodiment.

Then the photoresist is applied to the surface and windows (not show) for forming the metal patterns 41 to 43 by exposing and developing photoresist.

Figure 17C:
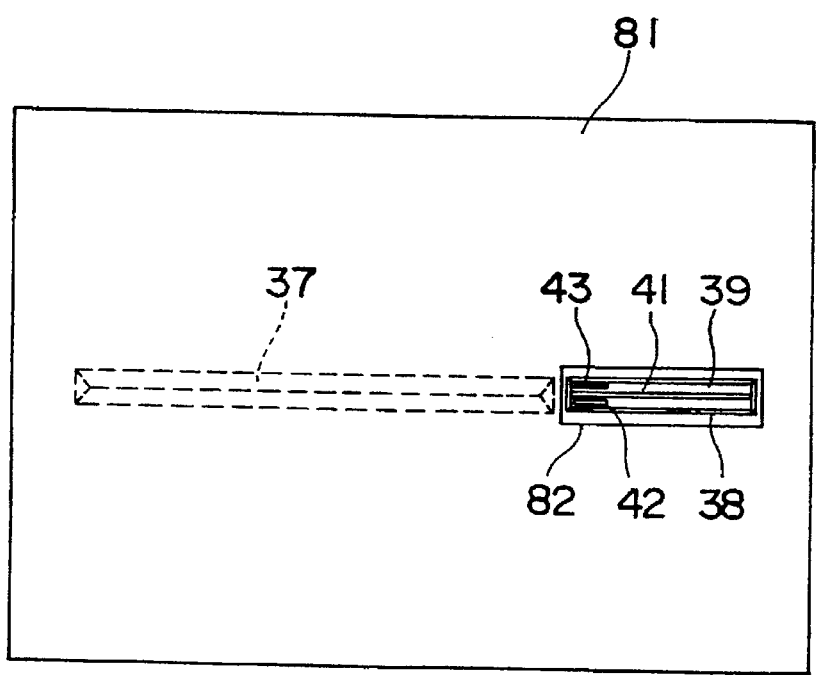

After this, Ti and Au films are formed by the vacuum evaporation, and thereafter the photoresist is removed. As shown in FIG. 17C, the same metal patterns 41 to 43 as in the first embodiment are formed on the first groove 38 via the silicon nitride film 39.

According to such method, since, upon applying the photoresist, the first V-shaped groove 37 is covered with the flat SiO₂ film 81, the photoresist cannot enter the first groove 37. Therefore, the lift-off method can be applied to the resultant structure.

Thereafter, the SiO₂ film 81 formed on the first groove 37 is removed, and then manufacturing steps shown in FIGS. 8E and 8F are effected.

(Fourth Embodiment)

The deep groove for fitting the optical fiber and the shallow groove for fitting the optical semiconductor device, as described above, can be formed by following steps.

Figure 18:
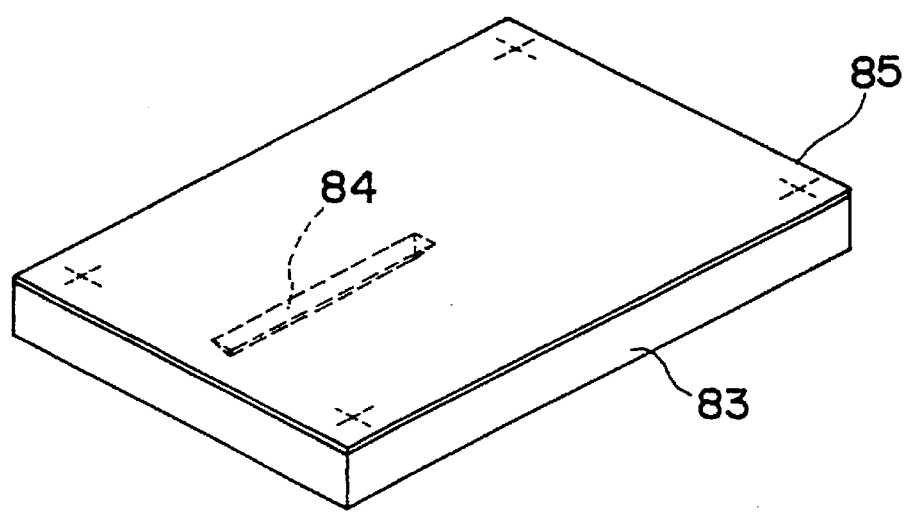
FIG. 18 is a perspective view showing steps for manufacturing an optical parts fixing device according to the fourth embodiment of the present invention.
Figure 19A:
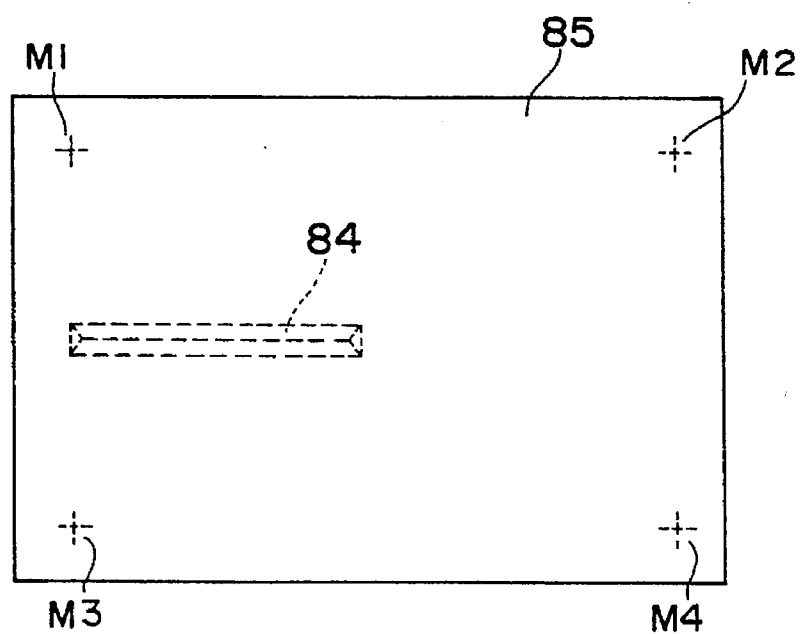
FIGS. 19A to 19G are plane views showing steps for manufacturing the same in FIG. 18.

First, as shown in FIGS. 18 and 19A, the V-shaped groove 84 of 100 µm in depth used for fitting the optical fiber is formed on the silicon substrate 83. The method of forming the V-shaped groove 84 is the same as that of the V-shaped groove 71 in the second embodiment. Alignment marks M1 to M4 on four corners of the upper surface of the silicon substrate 83 and V-groove 84 are formed at a same time by anisotropic etching.

These alignment marks M1 to M4 are used to align the photomask which is used when the photoresist is exposed in the following steps.

After this, the upper surface of the silicon substrate 83 is covered with the flat SiO₂ film 85 after the glued process identical to that of the third embodiment is effected.

Then, a patterning of the SiO₂ film 85 formed on the surface of the silicon substrate 83 is performed by the photolithography method to form three windows 86 to 88, like the case in FIG. 13A. The central window 87 is positioned on an extension line in the longitudinal direction of the V-groove 84 and spaced apart from the end portion of the V-shaped groove 84.

Figure 19B:
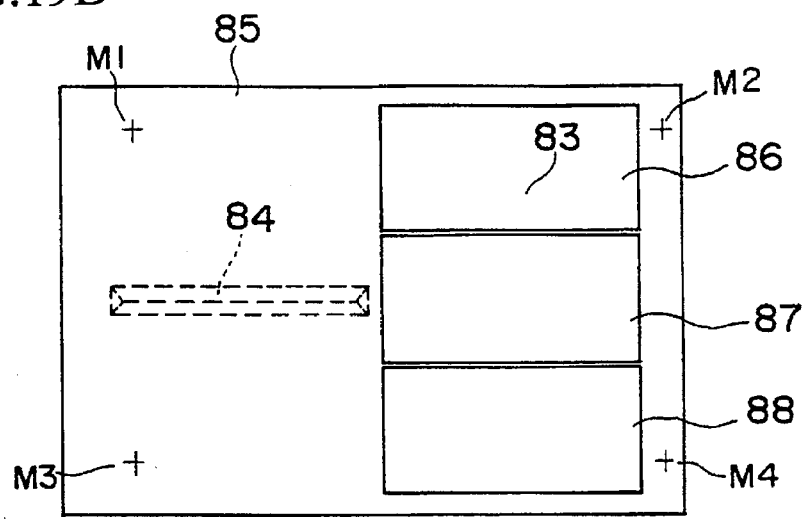
Figure 19C:
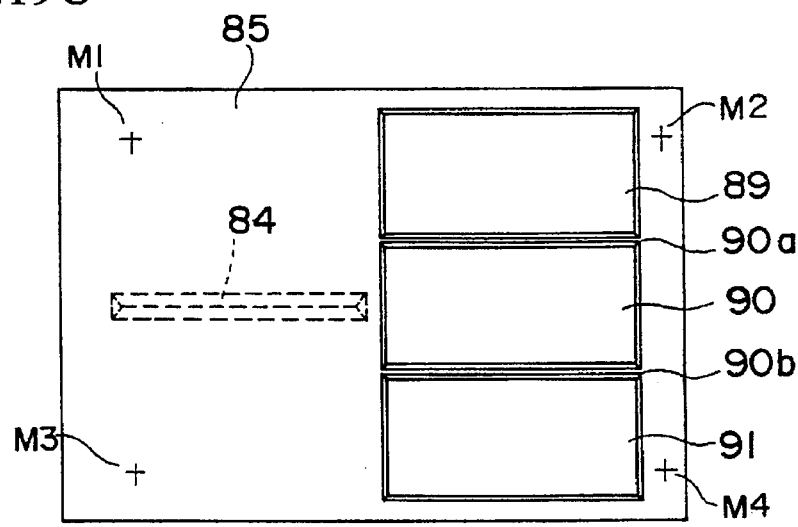

As shown in FIGS. 19B and 19C, the silicon substrate 83 exposed from windows 86 to 88 is wet-etched by the KOH aqueous solution to form the first to third inverse trapezoid grooves 89 to 91 therein. The wet-etching is conducted under the same condition as that used for forming the second groove 38 in the first embodiment to obtain a depth of 15 µm.

Figure 19D:
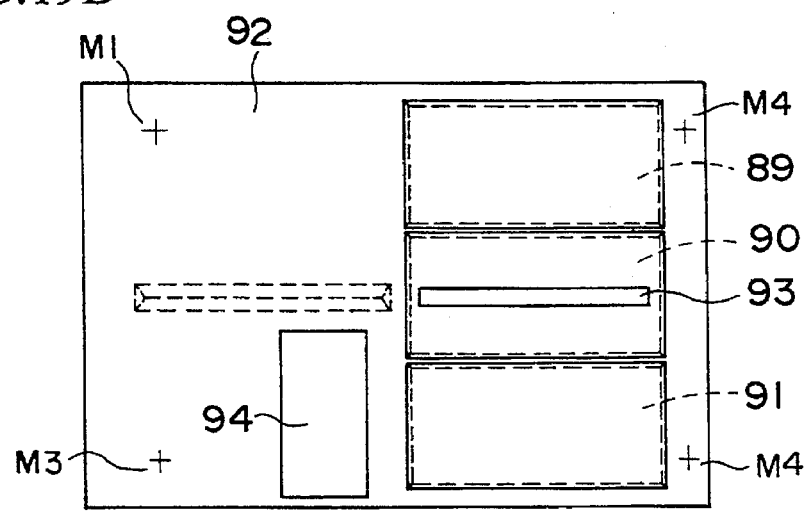

The silicon nitride film (Si₃N₄ film) 92 of 0.2 µm in thickness is formed on the entire surface by the plasma CVD method. Then, as shown in FIG. 19D, Ti and Pt films are formed on the silicon nitride film 92 by the vacuum evaporation. A stripe-like metal pattern 93 is formed on the silicon nitride film 92 on the second shallow window 90 and on the line extended from the V-groove 84. A strip-like metal pattern 94 is formed on an area adjacent to the V-shaped groove 84. These metal patterns 93 and 94 are formed by the lift-off method.

Figure 19E:
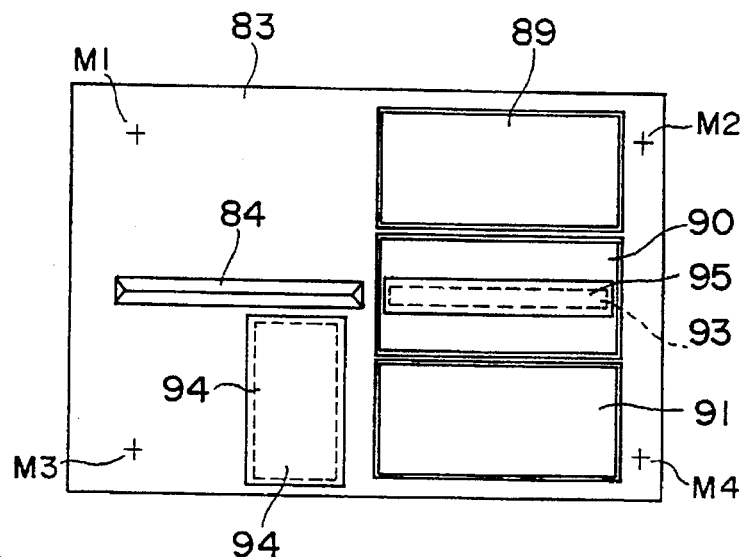

Subsequently, as shown in FIG. 19E, the photoresist 95 is applied to the surface. The metal film patterns 93, 94 are selectively covered by exposing and developing the photoresist selectively. Then, using the photoresist 95 as a mask, the silicon nitride film 92 is removed by the thermal phosphoric acid, and the $SiO_2$ film 83 is removed by the buffer hydrofluoric acid.

Figure 19F:
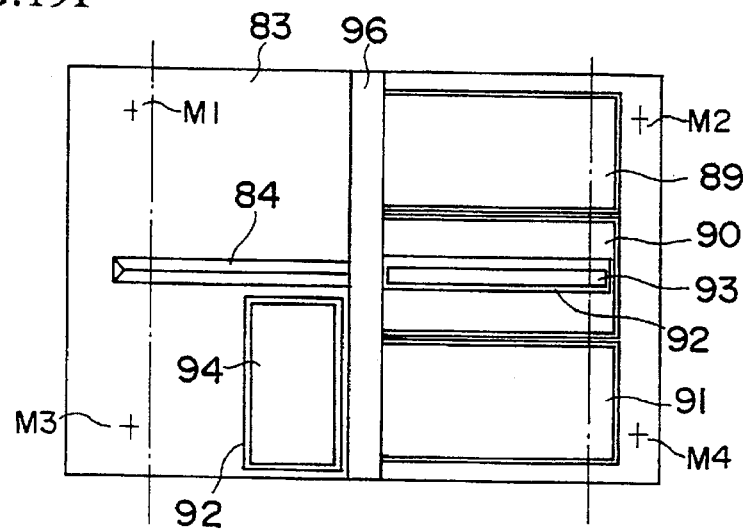

As shown in FIG. 19F, after the photoresist 95 is removed, a fifth groove 96 is formed by the dicing saw between the first to third grooves 89 to 91 and the V-shaped groove 84. The fifth groove 96 is formed in the direction perpendicular to the longitudinal direction of the V-shaped groove 84, and has a depth not shallower than that of the V-shaped groove 84. Thus the fifth groove 96 is formed to cross the end portions of the first to third grooves 89 to 91 and the V-shaped groove 84. As a result, the first to third grooves 89 to 91 and the V-shaped groove 84 is coupled to the side of the fifth groove 96.

Figure 19G:
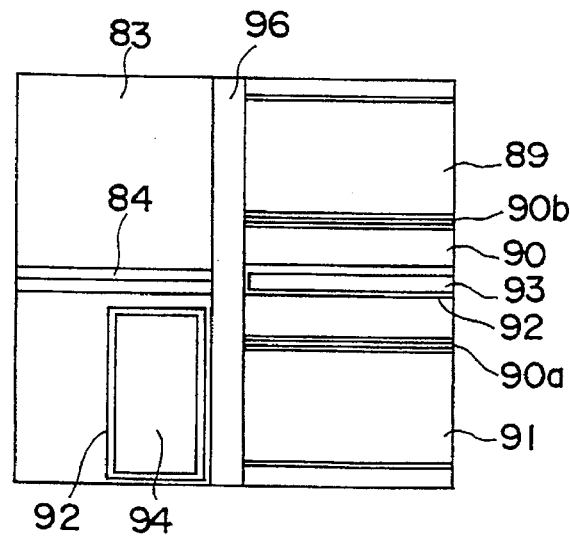

Subsequently, as shown by the dashed line in FIG. 19F, both ends of the silicon substrate 83 are cut off so as to cross the end portions of the first to third grooves 89 to 91 and the V-shaped groove 84 not coupled to the fifth groove 96. Thereby, as shown in FIG. 19G, an optical parts coupling device of the fourth embodiment is completed.

The optical parts coupling device has virtually the same structure as that of the coupling device of the second embodiment, except that the metal pattern 94 is formed adjacent to the V-shaped groove 84 and that one stripe-like metal pattern 93 is formed on the second groove 90.

Like the above embodiments, the optical fiber is fitted onto the V-shaped groove 84 shown in FIG. 19F.

Figures 1, 20A:
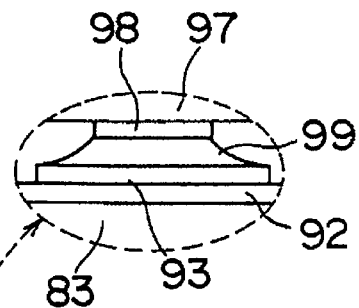
FIG. 20A is a cross-sectional view showing a situation where parts are fitted into the optical parts fixing device according to the fourth embodiment of the present invention.
Figure 20A:
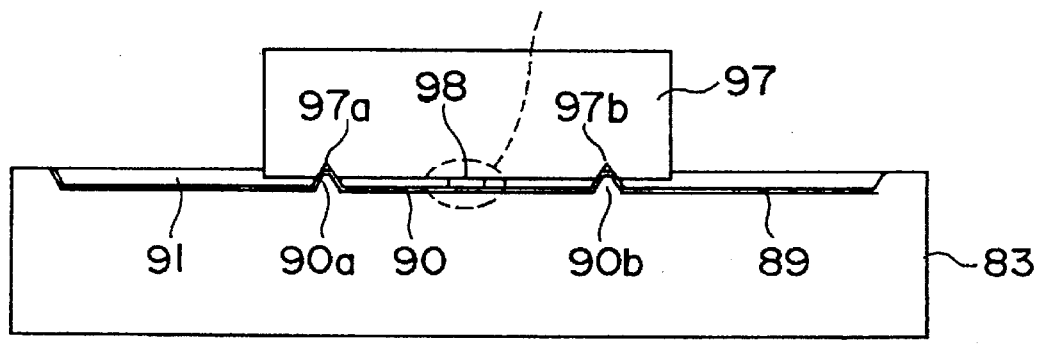

As shown in FIG. 20A, the grooves 97a and 97b formed on the optical semiconductor device 97 are fitted onto two projections 90a, 90b which are provided by forming the first to third grooves 89 to 91. The projections 90a, 90b formed on the silicon substrate 83 are fitted into the grooves 97a, 97b in the same manner as in the second embodiment. Only one electrode 98 is formed on the optical semiconductor device 97. The electrode 98 is connected to the metal pattern 93 via the AuSn solder 99.

Figure 20B:
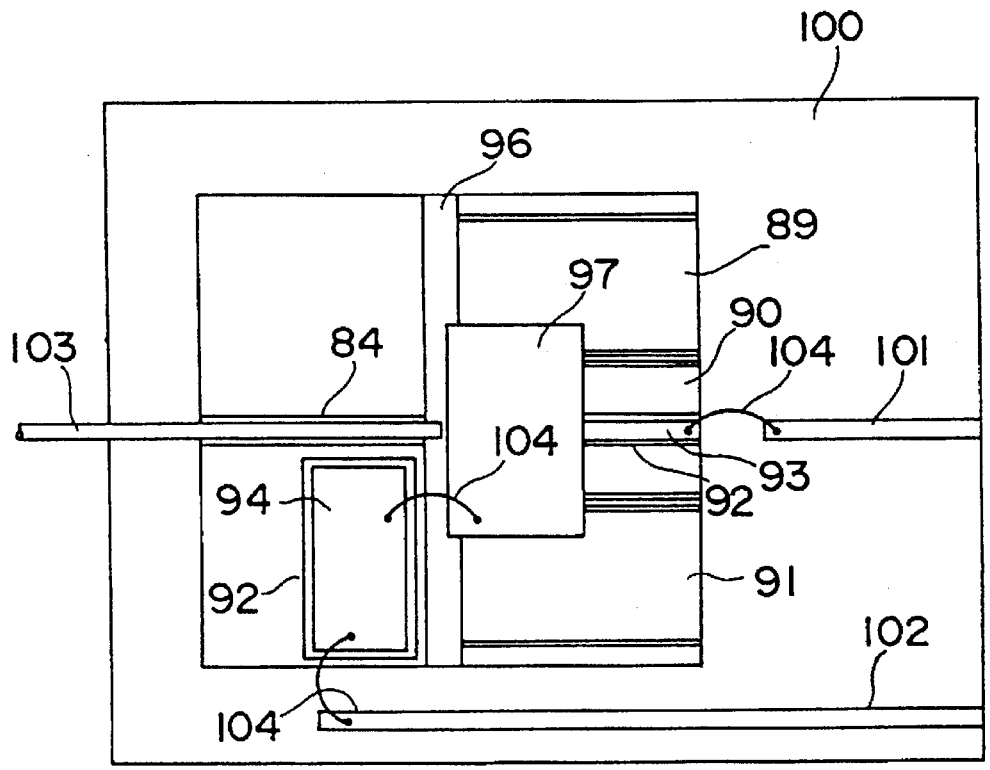
FIG. 20B is a plane view showing a situation where the optical parts fixing device according to the fourth embodiment of the present invention is used.

Such optical parts coupling device is sticked to other substrate 100 shown in FIG. 20B. Wiring patterns 101 and 102 formed on the substrate 100 are connected to metal patterns 93, 94 formed on the silicon substrate 83 by gold wires 104 by means of the wire-bonding. The optical fiber 103 is fitted into the V-shaped groove 84 on the silicon substrate 83.

Using the substrate 100 as a lead frame, a coupling portion between the optical semiconductor device 97 and the optical fiber 103 is covered, and then an epoxy resin is filled. Then the plastic molding is effected, so that a cheap package can be achieved.

(Fifth Embodiment)

Although the top of the optical fiber and the optical semiconductor device are directly connected in the above embodiments, they can be connected via an isolator.

Figure 21A:
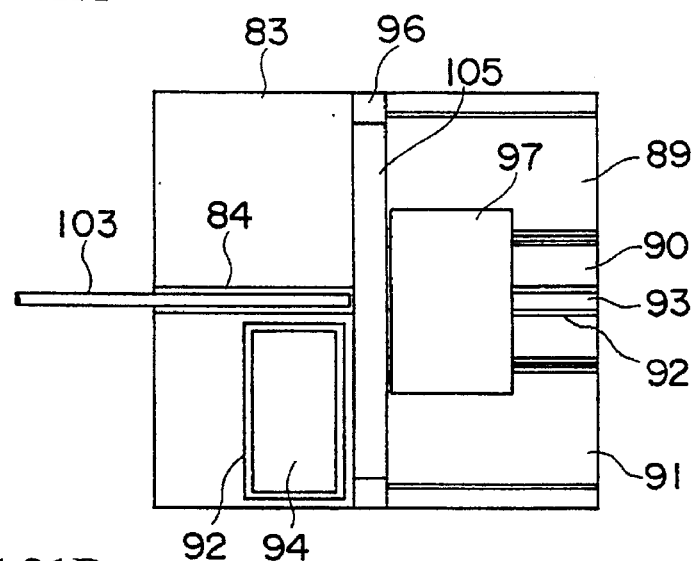
FIG. 21A is a plane view showing a situation where parts are fitted into an optical parts fixing device according to the fifth embodiment of the present invention.
Figure 21B:
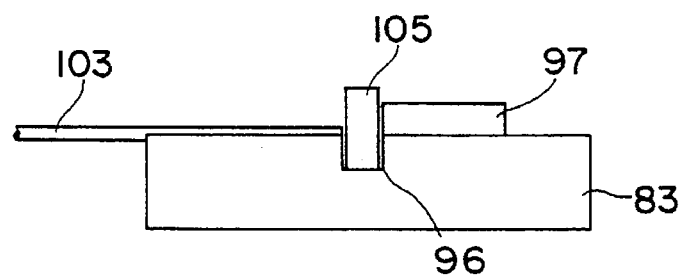
FIG. 21B is a cross-sectional view showing the same situation in FIG. 21A.

For example, as shown in FIGS. 21A and 21B, in the optical parts coupling device according to the fourth embodiment, the optical fiber and the optical semiconductor device can be coupled by mounting an optical isolator 105 in the fifth groove 96.

Figure 22:
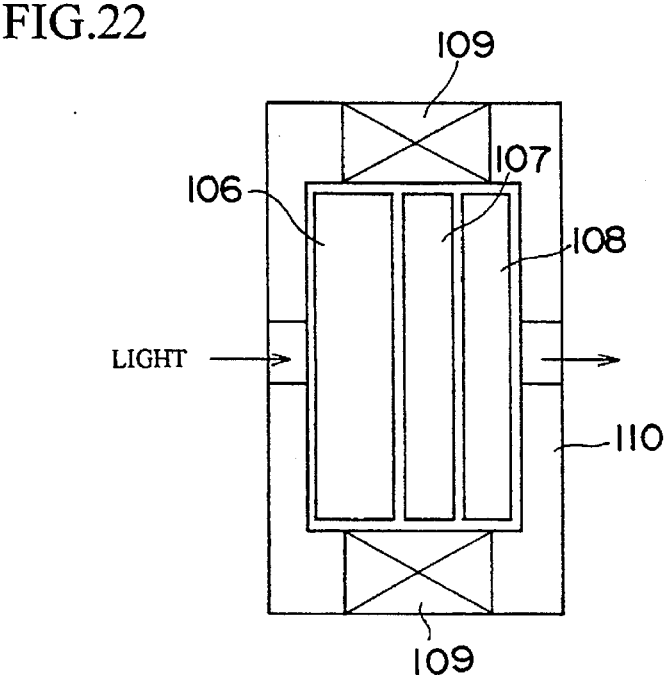
FIG. 22 is a cross-sectional view showing an example of an isolator.

For example, as shown in FIG. 22, the optical isolator 105 is so constructed that a first birefringence (double refraction) plate 106, a faraday rotator 107 and a second birefringence plate 108 are stacked, and that a magnet 109 and an iron core 110 are arranged to apply a magnetic field to them. The optical fiber 103 is connected to the birefringence plate 106, and an light emitting surface or an light receiving surface of the optical semiconductor device 97 is connected to the birefringence plate 108.

The optical isolator 105 has such size that the isolator 105 can be put in the deep grooves 40 and 75 shown in the first or second embodiments in the same manner.

By providing the optical isolators 105 in the deep grooves 40, 75 and 96, the reflected return light can be attenuated, so that an operation of the optical semiconductor device can be stabilized.

It should be noted that the optical isolator 105 may be put in the groove 40 in the coupling device of the first embodiment and the groove 75 in the coupling device of the second embodiment.

(Sixth Embodiment)

Figure 23A:
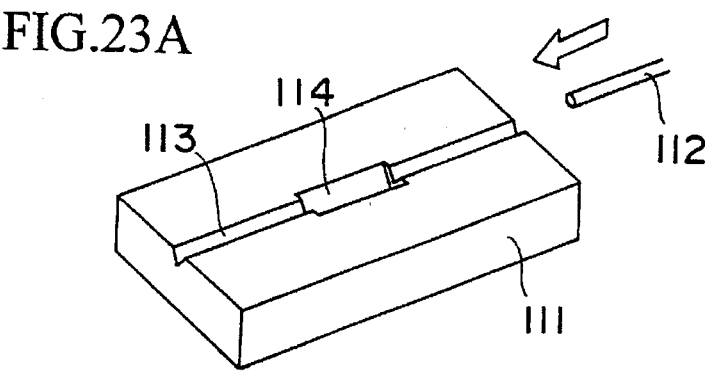
FIGS. 23A and 23B are perspective views showing a disassembled optical parts fixing device according to the sixth embodiment of the present invention.
Figure 23B:
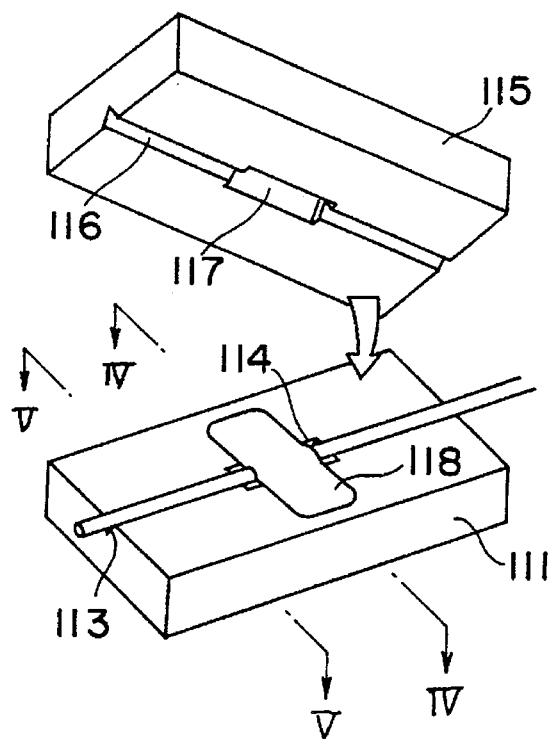

FIGS. 23A and 23B are perspective views showing an optical parts fixing device according to the sixth embodiment of the present invention.

Figure 24A:
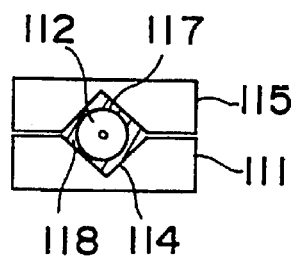
FIG. 24A is a cross-sectional view showing a sectional shape viewed from the line IV—IV in FIG. 23B.

In FIG. 24A, an alignment groove 113 for aligning an optical fiber 112 is formed on the first optical fiber supporting substrate 111. An extension groove 114 having a slightly large width is formed on part of the alignment groove 113. Sectional shapes of the alignment groove 113 and the extension groove 114 are not limited to this embodiment. If the silicon substrate is used as the first optical fiber supporting substrate 111 and the alignment groove 113 and the extension groove 114 are formed on the (100) face using the mask and the KOH aqueous solution, the alignment groove 113 and the extension groove 114 are formed to have the V-shaped sectional shape.

The optical fiber 112 is inserted into the alignment groove 113. The adhesive is applied in the extension groove 114 and its periphery. As shown in FIG. 23B, the second optical fiber supporting substrate 115, on which an alignment groove 116 having an extension groove 117 is formed, is put on the first optical fiber supporting substrate 111. The optical fiber 112 is sandwiched by the first optical fiber supporting substrate 111 and the second optical fiber supporting substrate 115 such that the extension grooves 114 and 117 in the alignment grooves 113 and 116 coincide with each other.

Figure 24B:
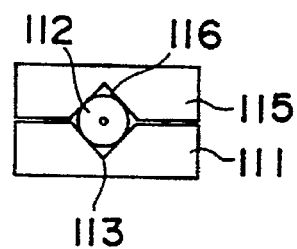
FIG. 24B is a cross-sectional view showing a sectional shape viewed from the line V—V in FIG. 23B.

As shown in FIG. 24A, the adhesive 118 is filled in the space between two extension grooves 114 and 117 and the optical fiber 112 by stiffening the adhesive 118 in the extension grooves 114 and 117, so that the optical fiber 112 can be fixed to the extension grooves 114 and 117. As shown in FIG. 24B, the alignment grooves 113 and 116 on the first and second optical fiber supporting substrates 111 and 115 are so formed that areas excluding the extension grooves 114 and 117 sandwich the optical fiber 112 to fix it. The optical fiber 112 is positioned by these areas.

As described above, in this embodiment, areas for preventing the optical fiber 112 and the groove from directly contacting are provided by forming the extension grooves 114 and 117 on part of the alignment grooves 113 and 116.

Since the extension grooves 114 and 117 is not relevant to the alignment of the optical fiber 112, there is no influence on the alignment of the optical fiber 112 when the adhesive is applied to such grooves 114 and 117. The spaces between the optical fiber 112 and the large extension grooves 114 and 117 are filled with the adhesive and, therefore, the fixing strength of the optical fiber 112 can be increased and the alignment grooves 113 and 116 can be hermetically sealed up.

The extension grooves 114 and 117 serves to absorb the extra adhesive 118 and thus prevents the adhesive from flowing out. Thus the adhesive 118 can be suppressed to enter into the alignment grooves 113 and 116, and the adhesive between the first optical fiber supporting substrate 111 and the second optical fiber supporting substrate 115 can be made extremely thin. As a result, the alignment grooves 113 and 116 can place precisely the optical fiber 112 by directly supporting it with their inner walls. In addition, even if the solder is used as the adhesive 118, the oxide film of the solder, generated when the substrates are heated, seldom remains in the alignment grooves 113 and 116. The inner walls of the alignment grooves 113 and 116 and the optical fiber 112 are directly contacted to each other, so that the optical fiber 112 can be precisely positioned.

When the metal film is formed on the surfaces of the optical fiber supporting substrates 111 and 115 and the optical fiber 112 is coated with the metal, a solder material having a high melting point may be used as the adhesive.

(Seventh Embodiment)

Figure 25A:
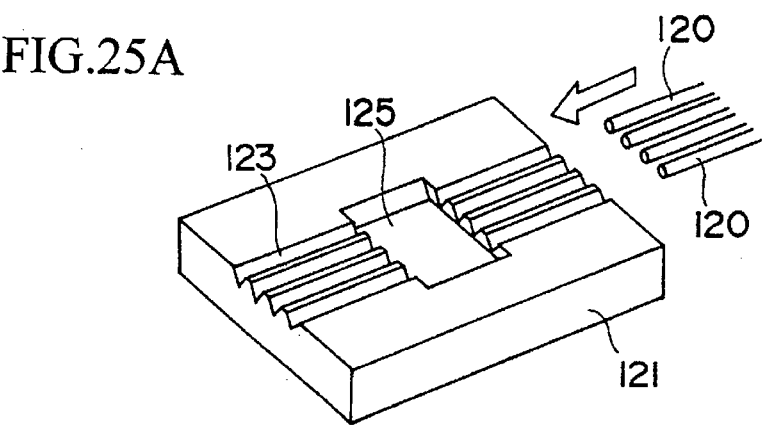
FIGS. 25A and 25B are perspective views showing a disassembled optical parts fixing device according to the seventh embodiment of the present invention.
Figure 25B:
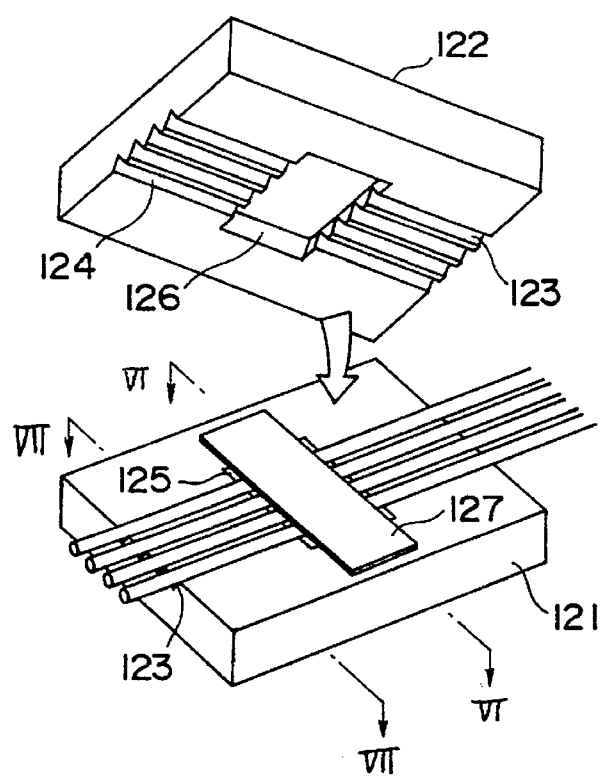

FIGS. 25A and 25B are perspective views showing an optical parts fixing device according to the seventh embodiment of the present invention.

Figure 26A:
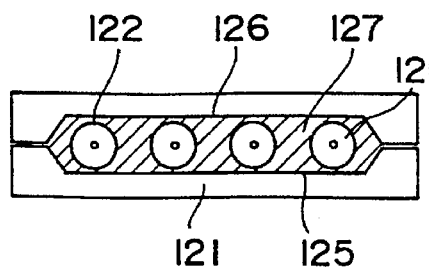
FIG. 26A is a cross-sectional view showing a sectional shape viewed from the line VI—VI in FIG. 25B.
Figure 26B:
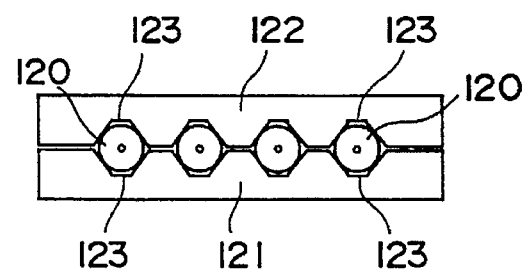
FIG. 26B is a cross-sectional view showing a sectional shape viewed from the line VII—VII in FIG. 25B.

The first optical fiber supporting substrate 121 and the second optical fiber supporting substrate 122, shown in FIGS. 25A and 25B, have alignment grooves 123 and 124 for sandwiching a multi-core optical fibers 120, and lateral grooves 125 and 126 crossing the alignment grooves 123 and 124. The lateral grooves 125 and 126 are formed slightly wider than those of the alignment grooves 123 and 124 for sandwiching multi-core optical fibers 120. Note that, as shown in FIGS. 26A and 26B, using the anisotropic etching property of the (100) face of the silicon, each of the alignment grooves 123, 124 and the lateral grooves 125, 126 can be formed to have an inverse trapezoid sectional shape. As described above, in this embodiment, areas for preventing direct contacts between the optical fibers 120 and the grooves are provided by forming the lateral grooves 125 and 126 on part of the alignment grooves 123 and 124.

Since the lateral grooves 125 and 126 are not relevant to the alignment of the optical fibers 120, there is no influence on the alignment of the optical fibers 120 when the adhesive 127 is applied to such grooves. Since the spaces between the optical fibers 120 and the large lateral grooves 125 and 126 are filled with the adhesive 127. Therefore, the fixing strength of the optical fibers 120 can be increased, and the alignment grooves 123 and 124 can be hermetically sealed up.

The lateral grooves 125, 126 serves to absorb the adhesive 127 and thus prevents the adhesive 127 from flowing out. Thus the adhesive 127 can be suppressed to enter into the alignment grooves 123 and 124. The layer of the adhesive 127 between the first optical fiber supporting substrate 121 and the second optical fiber supporting substrate 122 can be made extremely thin. As a result, the alignment grooves 123 and 124 can directly support the optical fibers 120 with their inner walls to place precisely the fibers 120. In addition, even if the solder is used as the adhesive 127, the oxide film of the solder, generated when the substrates are heated, scarcely remains in the alignment grooves 123 and 124.

Therefore, the inner walls of the alignment grooves 123, 124 and the optical fiber 120 is directly contacted to each other, so that the optical fibers 120 can be precisely positioned.

Accordingly, it becomes possible that all the multi-core optical fibers 120 are positioned with high accuracy. In case, since location displacement and variation of the optical fibers are eliminated, fixing process of the optical fibers and coupling process of the optical device are effected simultaneously, like the optical module. Further, optical couplings can be achieved at high efficiency and with good reproductivity and high reliability. Since the fixing of the optical fibers 120 and the hermetic seal of the optical fibers 120 in the alignment grooves 123 and 124 can be effected simultaneously, assembling steps of the optical module can be made simple.

When the metal film is formed on the surfaces of the optical fiber supporting substrates 121 and 122 and the optical fibers 120 are coated with the metal, a solder material having a high melting point may be used as the adhesive to fix the fibers.

(Eighth Embodiment)

Figure 27:
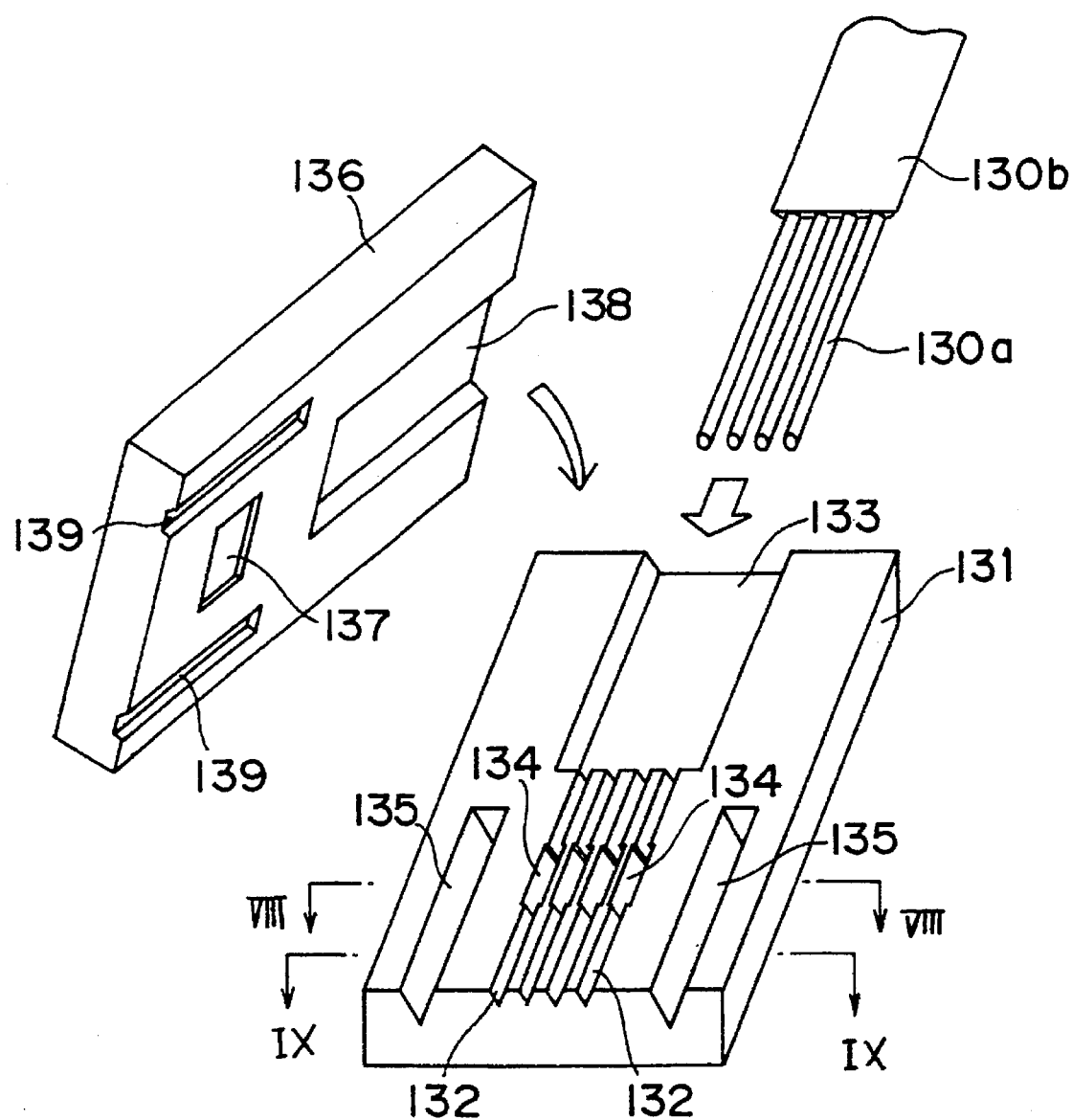
FIG. 27 is a perspective view showing an assembling of the optical parts fixing device according to the eighth embodiment of the present invention.

FIG. 27 is a perspective view showing the eighth embodiment of the present invention.

In FIG. 27, the first supporting substrate 131 for supporting an optical fiber array is made of, for example, ceramic, plastic, or silicon. A plurality of alignment grooves 132 for fixing the optical fibers 130a thereon are formed in parallel on the upper surface of the substrate 131. A coating receiving groove 133, to which a protection coating 130b of the optical fiber 130a is fitted, is formed in the rear side of the alignment grooves 132. Also an extension groove 134 having a wider width and a deeper depth than those of the groove 132 is formed on part of each alignment groove 132. Two pin inserting grooves 135 into which guide pins 135a are inserted are formed on both outer sides of the alignment grooves 132.

A shallow lateral groove 137 to be covered by the first supporting substrate 131 is formed on the second supporting substrate 136 in registration to the location of the plurality of extension grooves 134. A coating receiving groove 138, to which the protection coating 130b of the optical fiber 130a is fitted, is formed in the rear side of the alignment grooves 132 at a certain distance. Pin insert holes 139 are formed on both sides of the lateral grooves 137. Both coating receiving grooves 133 and 138 of the first and second supporting substrates 131 and 136 are formed so as to overlap each other. Guide pin inserting grooves 135 and 139 are formed so as to coincide their locations with each other.

In the meanwhile, the optical fiber 130a to be inserted into the alignment grooves 132 has a diameter of 125 µm, for example. In case the alignment grooves 132 is formed to have a V-shaped sectional shape corresponding to the size of the optical fiber, the alignment grooves 132 has a slant face inclined at angle 55°, and has a width of 225 µm on the surface of the first supporting substrate 131. Also the extension grooves 134 is formed to have a width of 265 µm. The lateral groove 137 opposing to the plurality of the extension grooves 134 is formed to have a depth of 20 µm.

In the optical fiber connector constructed above, the optical fiber 130a and its protection coating 130b are placed at a predetermined position on the first supporting substrate 131. The hot-melt adhesive 140 is positioned on the extension groove 134 and the coating receiving groove 133. The second supporting substrate 136 is put on the first supporting substrate 131 so as to sandwich the optical fiber 130a and the protection coating 130b. Then the second supporting substrate 136 is pressed. Subsequently, the resultant structure is heated at about 100° C. to make the viscosity of the hot-melt adhesive 140 small, and thereafter it is cooled.

Figure 28A:
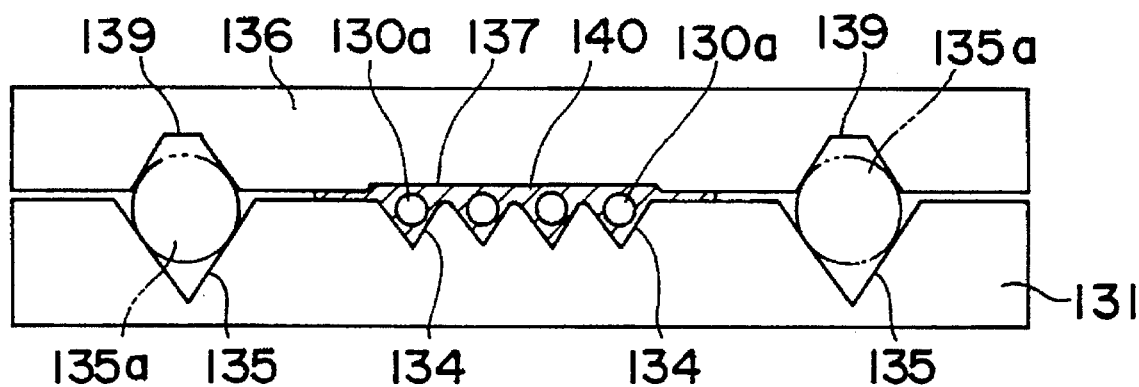
FIG. 28A is a cross-sectional view showing a sectional shape viewed from the line VIII—VIII in FIG. 27.
Figure 28B:
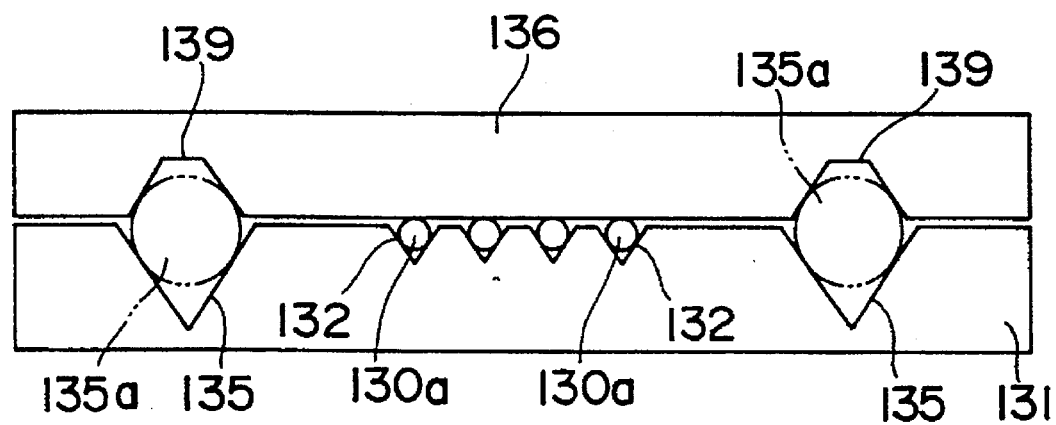
FIG. 28B is a cross-sectional view showing a sectional shape viewed from the line IX—IX in FIG. 27.

During the process, by applying pressure to the first supporting substrate 131 and the second supporting substrate 136, a part of the hot-melt adhesive 140 is caused to flow into the clearance between the lateral groove 137 and the optical fibers 130a, so that, as shown in FIG. 28A, the clearance is filled with the adhesive 140. Also, as shown in FIG. 28B, the optical fibers 130a are pushed against the inner wall of the alignment grooves 132 by the flat surface of the second supporting substrate 136 to thus be fixed firmly.

Thereafter, the optical connector is completed by polishing the end surfaces of the optical fibers 130a.

(Ninth Embodiment)

Figure 29:
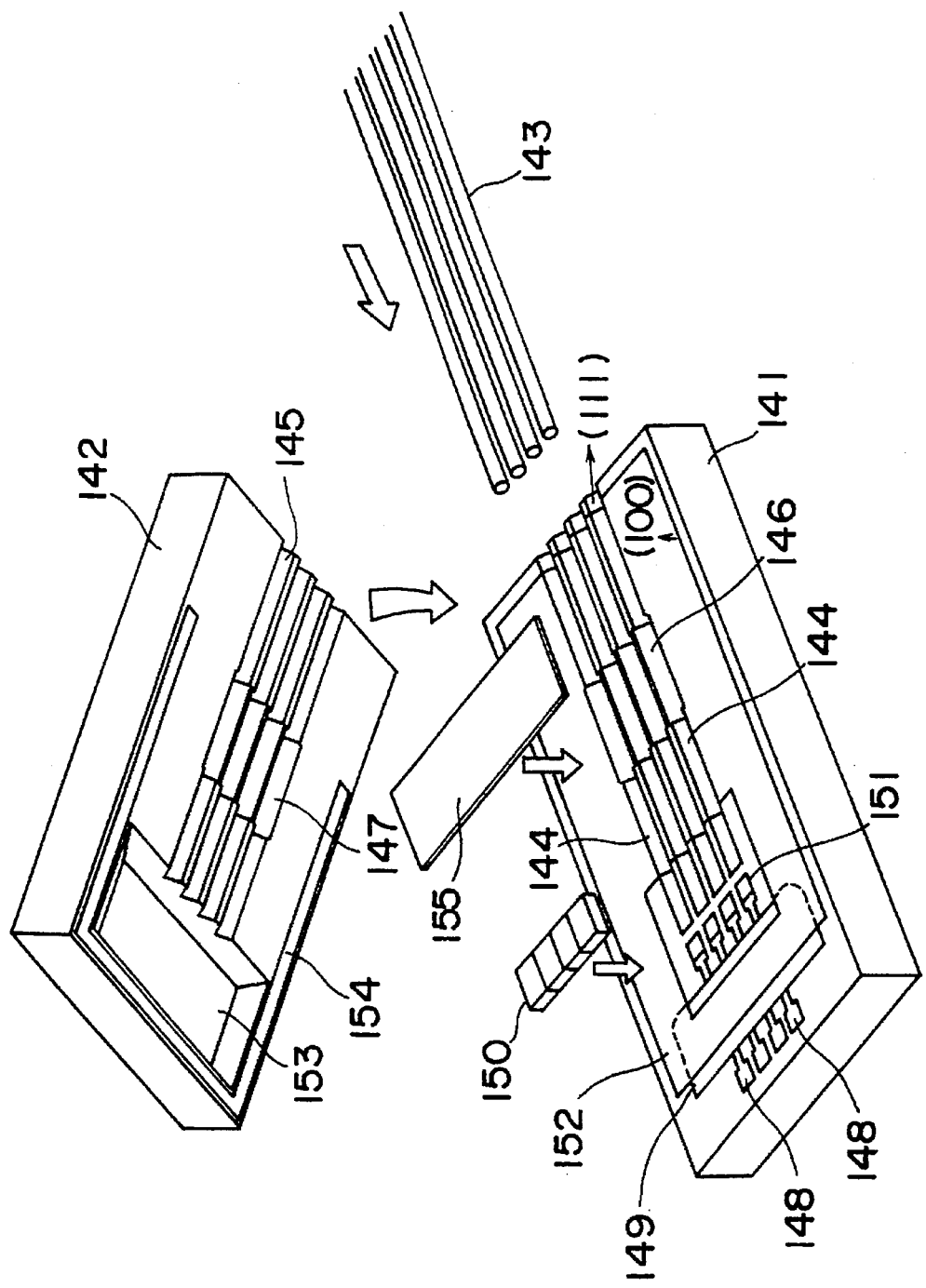
FIG. 29 is a perspective view showing an assembling of an optical parts fixing device according to the ninth embodiment of the present invention.

FIG. 29 is a perspective view showing a disassembled optical array module according to the ninth embodiment of the present invention. In this embodiment, the first supporting substrate 141 and the second supporting substrate 142 are also used.

The first supporting substrate 141 and the second supporting substrate 142 are formed of the silicon substrate having a (100) plane as a principle face. Alignment grooves 144, 145 having a width of 145 µm and a depth of about 70 µm to fit the optical fiber 143 therein are formed on the principle faces. Extension grooves 146 and 147, each having a width which is wider by 20 µm than that of the alignment grooves 144, 145 and a depth of 70 µm, are formed on part of the alignment grooves 144 and 145, respectively. Each of the alignment grooves 144 and 145 and the extension grooves 146 and 147 is formed by the anisotropic etching using the KOH aqueous solution to have a V-shaped sectional shape. These slant face are composed of a (111) plane.

The alignment grooves 144, 145 are so formed on the first supporting substrate 141 and the second supporting substrate 142, respectively, that their locations coincide with each other. The extension grooves 146 and 147 are also formed at their corresponding locations.

A plurality of electrode leads 148 are formed about 1 µm in thickness on the first supporting substrate 141 in the extension line of each alignment groove 144. Central portions of these electrode leads 148 are covered with the $SiO_2$ film 149 having a thickness of at least 1 µm. The electrode leads 148 is formed of a multilayered structure of titanium (Ti), nickel (Ni) and gold (Au), which are stacked by the vacuum evaporation and then patterned by the photolithography method.

An AuSn solder 151 of about 3 µm in thickness for connecting a semiconductor laser array 150 is formed on the end portion of the electrode lead 148 near the alignment groove 144.

In addition, the principle face of the first supporting substrate 141 is covered with a metal covering film 152 having a thickness of at least 0.5 µm, except for both the area, which includes one end portion of the electrode lead 148 covered with the AuSn solder 151 and one end portion of the alignment groove 144 near the electrode lead 148, and the area, which includes other end of the electrode lead 148 not covered with the AuSn solder 151. The metal covering film 152 is made of a multilayered structure of Ti and Au formed by the vacuum evaporation.

A concave portion 153 having an width capable of sufficiently covering such area and a depth of about 200 µm is formed to be coupled to the alignment groove 145, in an area corresponding to the optical coupling portion between the semiconductor laser array 150 and the optical fiber 143 on the second supporting substrate 142. The substrate 142 is placed on the first supporting substrate 141. The concave portion 153 is formed by effecting selectively the anisotropic etching of the second supporting substrate 136 of the silicon using the KOH aqueous solution.

A lead-tin (PbSn) solder 154 is formed along with the edge of the second supporting substrate 142 so as to have an almost U-shaped planar shape in the area including the extension grooves 147 and the concave potion 153. The PbSn solder 154 is formed to have a thickness of at least 10 µm by the evaporation.

In the first supporting substrate 141 and the second supporting substrate 142 having structures as above, first the semiconductor laser array 150 is attached on the electrode lead 148 via the AuSn solder 151. Then, while the optical fiber 143 is inserted into the alignment groove 144, the PbSn solder sheet 155 of about 50 µm in thickness is arranged on the extension groove 146. The optical fiber 143 is covered with a metal layer made of Ni and Au and having a thickness of about 1 µm by the vacuum evaporation or the plating.

The second supporting substrate 142 is put on the second supporting substrate 142 so that the alignment grooves 144, 145, each formed on different substrates, coincide with each other. After this, with applying the pressure, the whole structure is heated up to about 200° C. to melt the PbSn solder 154 and the PbSn solder sheet 155. Subsequently, the resultant structure is cooled to fix the optical fiber 143 to the first supporting substrate 141 and the second supporting substrate 142.

During this process, a part of the PbSn solder sheet 155 flows into the clearances between the optical fibers 143 and the extension grooves 146 to fill up such clearances, so that the optical fibers 143 are fixed to the first supporting substrate 141 and the second supporting substrate 142. At the same time, the hermetic seal can be achieved by the PbSn solder sheet 155 and the PbSn solder 154 on the second supporting substrate 142 so as to surround the optical coupling portions.

In this case, the melted PbSn solder sheet 155 has an amount to fill only the clearances between the optical fibers 143 and the extension grooves 146. As a result, the melted PbSn solder sheet 155 never contaminates the optical coupling sections.

Sizes of the extension grooves 146 and 147 can be adjusted according to the amount of the solder sheet 155.

What is claimed is:

1. An optical parts fixing device comprising:

a first substrate having thereon a first groove into which an optical fiber is fitted, and a second groove to fix the optical fiber by applying adhesive, the second groove being formed on part of the first groove, a width and a depth of the second groove being wider and deeper than those of the first groove so that the optical fiber is not in contact with the second groove; and a second substrate for pushing the optical fiber against the first groove.

2. The optical parts fixing device according to claim 1, wherein a third groove is formed on the second substrate so as to coincide its location with the second groove and have a width wider than that of the first groove.

3. The optical parts fixing device according to claim 1, wherein a third groove, which is formed at a location opposed to the second groove and has a width equal to or larger than that of the second groove, and a fourth groove, which is formed at a location opposed to the first groove and has the same width as the first groove, are formed on the second substrate.

4. The optical parts fixing device according to any one of claims 1–3, wherein a first metal layer to be melted by heating is formed on at least one surface of the first substrate and the second substrate, and a second metal layer to be melted by heating is formed around the optical fiber.

5. The optical parts fixing device according to claim 1, wherein the second groove has enough width to fix a plurality of optical fibers.

6. A method of manufacturing an optical parts fixing device comprising the steps of:

forming a first masking film on a principle face of a substrate;

forming a first window as stripe-like shape at an optical fiber fitting location by patterning the first masking film and forming a second window spaced apart from the first window and ahead of the first window;

forming a second masking film on the first window, the second window and the first masking film;

forming a third window by patterning the second masking film to expose selectively the first window;

forming a first groove by etching the substrate exposed from the second window and the third window;

removing the second masking film selectively;

forming a second groove to be fitted onto projections of an optical semiconductor device to have a depth shallower than that of the first groove by etching the substrate exposed through the second window; and forming a third groove mechanically on the substrate in the direction perpendicular to the first groove so as to contact with ends of the first groove and the second groove.

7. A method of manufacturing an optical parts fixing device comprising the steps of:

forming a first masking film on a principle face of a substrate;

forming a second windows at an optical semiconductor fitting location by patterning the first masking film;

forming a second grooves by etching the substrate exposed from the second windows;

removing a first masking film;

forming the second masking film on a principle face of the substrate;

forming a first stripe-like window spaced apart from the second grooves by patterning the second masking film;

forming a first groove for fitting an optical fiber therein and having a depth deeper than that of the second grooves by etching the substrate exposed from the first window; and forming a third groove mechanically on the substrate in the direction perpendicular to the first groove so as to contact with ends of the first groove and the second grooves.

8. A method of manufacturing an optical parts fixing device comprising the steps of:

forming a first groove for fitting an optical fiber therein on a principle face of a first substrate, and forming a second groove for fitting an optical semiconductor device therein and having a depth shallower than that of the first groove, and spaced apart from and ahead of the first groove;

bonding one surface of a second substrate covered by a masking film to a principle face of the first substrate;

removing the second substrate by grinding and etching the second substrate from the other surface side thereof so as to remain only the masking film on the principle face of the first substrate;

removing the masking film above the second groove so as to expose the second groove;

forming a insulating film on the bottom surface of the second groove, and forming metal patterns on the insulating film;

removing the masking film above the first groove so as to expose the first groove; and forming a third groove mechanically on the first substrate in the direction perpendicular to the first groove so as to contact with ends of the first groove and the second grooves.

9. A method of manufacturing an optical parts fixing device comprising the steps of:

forming a first groove as stripe-like shape for fitting an optical fiber therein on a principle face of a first substrate;

bonding one surface of a second substrate covered by a masking film to the principle face of the first substrate;

removing the second substrate by grinding and etching the second substrate from the other surface side thereof so as to remain only the masking film on the principle face of the first substrate;

forming a second window ahead of the first groove and spaced apart from the first groove by patterning the masking film;

forming a second grooves for fitting an optical semiconductor device therein and having a depth shallower than that of the first groove by etching the first substrate exposed from the second windows;

forming a insulating film on a bottom surface of the second groove;

forming metal pattern on the second groove through the insulating film by the photolithography method;

removing the masking film above the first groove so as to expose the first groove; and forming a third groove on the first substrate in the direction perpendicular to the first groove so as to contact with ends of the first groove and the second grooves.

10. A method of manufacturing an optical parts fixing device comprising the steps of:

forming a first groove as stripe-like shape for fitting an optical fiber therein on a principle face of a first substrate;

bonding one surface of a second substrate covered by a masking film to the principle face of the first substrate;

removing the second substrate by grinding and etching the second substrate from the other surface side thereof so as to remain only the masking film on the principle face of the first substrate;

forming a plurality of second windows ahead of the first groove and spaced apart from the first groove by patterning the masking film;

forming a plurality of grooves so as to form a projection-like stripe for fitting an optical semiconductor device with fitting-groove by fitting the fitting-groove on the projection-like stripe, the projection-like stripe being formed between a pair of the second grooves, the projection-like stripe having a straight and stripe shaped ridge;

forming a insulating film on a bottom surface of the second groove;

forming a metal pattern on the insulating film on a bottom surface of the second groove;

removing the masking film above the first groove so as to expose the first groove; and forming a third groove on the first substrate in the direction perpendicular to the first groove so as to pass opposed ends of the first groove and the second grooves.

11. An optical parts fixing device comprising:

a first substrate including a first groove extending in a first direction, and a second groove, deeper and wider than said first groove, overlapping said first groove and extending in the first direction;

an optical fiber fitted in at least part of said first groove, extending in the first direction, and at least partially extending into said second groove; and adhesive coupling said optical fiber to the sides of said second groove.

12. The optical parts fixing device of claim 11, wherein said optical fiber is spaced apart from the sides of said second groove.

13. The optical parts fixing device of claim 11, wherein said first and second grooves are V-shaped.

14. The optical parts fixing device of claim 11, further comprising a second substrate, mated to said first substrate to press said optical fiber against said first groove.

15. The optical parts fixing device of claim 14, wherein said second substrate includes a third groove extending in the first direction, and a fourth groove, wider and deeper than said third groove, overlapping said third groove and extending in the first direction; and said optical fiber is fitted in at least part of said third groove, and extends at least partially into said fourth groove, said adhesive coupling said optical fiber to the sides of said fourth groove.

* * * * *